(12) United States Patent
Xie et al.

(10) Patent No.: US 8,687,471 B2
(45) Date of Patent: Apr. 1, 2014

(54) METHOD AND APPARATUS FOR OFFSET AND GAIN CORRECTION

(75) Inventors: Jin Xie, Longmont, CO (US); Mats Oberg, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/596,487

(22) Filed: Aug. 28, 2012

(65) Prior Publication Data

US 2012/0320723 A1 Dec. 20, 2012

Related U.S. Application Data

(63) Continuation-in-part of application No. 13/101,439, filed on May 5, 2011.

(60) Provisional application No. 61/333,190, filed on May 10, 2010, provisional application No. 61/532,483, filed on Sep. 8, 2011.

(51) Int. Cl.
*G11B 15/52* (2006.01)
(52) U.S. Cl.
USPC ..................... 369/47.28; 369/53.34
(58) Field of Classification Search
None
See application file for complete search history.

(56) References Cited

U.S. PATENT DOCUMENTS

| | | | |
|---|---|---|---|
| 6,104,557 A | 8/2000 | Kasai et al. | |
| 7,167,516 B1 * | 1/2007 | He | 375/232 |
| 7,447,262 B2 * | 11/2008 | Tseng et al. | 375/232 |
| 8,072,854 B1 | 12/2011 | Oberg et al. | |
| 2004/0141571 A1 | 7/2004 | Nagano | |
| 2005/0117484 A1 | 6/2005 | Tatsuzawa | |
| 2006/0215520 A1 | 9/2006 | Lai et al. | |
| 2009/0002862 A1 | 1/2009 | Park et al. | |
| 2009/0028017 A1 | 1/2009 | Sano | |
| 2011/0273974 A1 | 11/2011 | Xie et al. | |

FOREIGN PATENT DOCUMENTS

| | | |
|---|---|---|
| DE | 35 40 722 A1 | 5/1987 |
| EP | 0 562 963 A1 | 9/1993 |
| EP | 1 154 428 A2 | 11/2001 |
| GB | 2 119 189 A | 11/1983 |
| JP | 2004-234808 A | 8/2004 |

OTHER PUBLICATIONS

International Search Report mailed Aug. 25, 2011 in counterpart International Application No. PCT/US2011/035323.
International Search Report and Written Opinion of the International Searching Authority, mailed Dec. 5, 2012 in International Application No. PCT/US2012/052664.

* cited by examiner

*Primary Examiner* — Paul Huber

(57) ABSTRACT

Aspects of the disclosure provide a signal processing circuit that includes a signal processing circuit includes a processing path configured to process an electrical signal to produce input data samples, and a feed-forward correction module configured to delay the input data samples to produce delayed data samples, to apply the delayed data samples to a timing loop during periods when a profile variation of the data samples is not detected, and to apply the input data sample to the timing loop during periods when a profile variation of the data samples is detected.

20 Claims, 18 Drawing Sheets

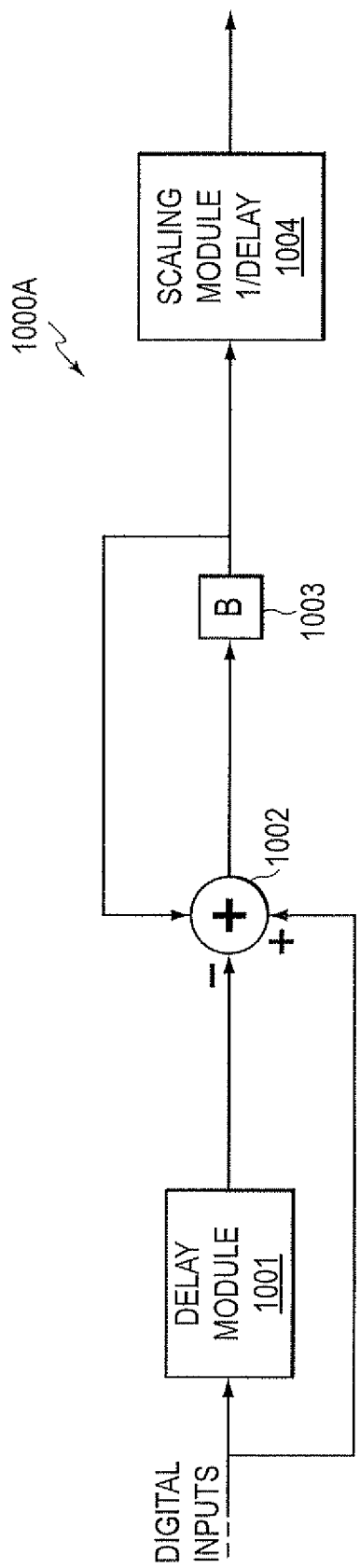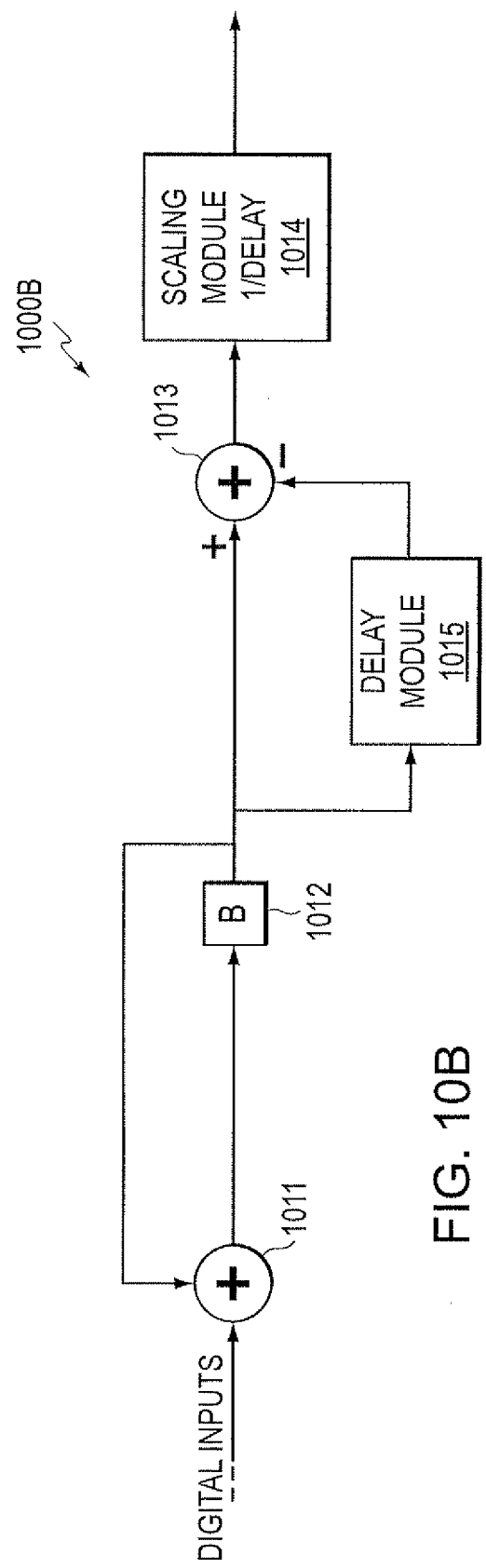
FIG. 10A
FIG. 10B

METHOD AND APPARATUS FOR OFFSET AND GAIN CORRECTION

INCORPORATION BY REFERENCE

This application claims priority from U.S. application Ser. No. 13/101,439 entitled "Method and Apparatus for Offset and Gain Correction" filed on May 5, 2011, which itself takes priority from U.S. Provisional Application No. 61/333,190, "Fast Feed Forward Offset and Gain Correction for Read Channel" filed on May 10, 2010, the content of both are incorporated herein by reference in their entirety. This application also claims priority from U.S. Provisional Application No. 61/532,483 entitled "Time Loop Delay Control" filed on Sep. 8, 2011, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a signal processing circuit uses offset and gain control techniques to keep amplitude and offset of a signal at desired levels. In an example, an optical storage device includes a read channel that receives an electrical signal corresponding to information on an optical storage medium. The read channel includes an offset control loop to keep an offset of the electrical signal at a desired level. In addition, the read channel includes a gain control loop to keep an amplitude of the electrical signal at a desired level.

SUMMARY

Various aspects and embodiments of the invention are described in further detail below.

In an embodiment, a signal processing circuit includes a processing path configured to process an electrical signal to produce input data samples, and a feed-forward correction module configured to delay the input data samples to produce delayed data samples, to apply the delayed data samples to a timing loop during periods when a profile variation of the data samples is not detected, and to apply the input data samples to the timing loop during periods when a profile variation of the data samples is detected.

In another embodiment, a signal processing method includes receiving input data samples, detecting whether or not a profile variation of the input data samples is occurring, delaying the received data samples to produce delayed data samples, and a applying the delayed data samples to a timing loop during periods when a profile variation of the data samples is not detected, and applying the input data samples to the timing loop during periods when a profile variation of the data samples is detected.

BRIEF DESCRIPTION OF THE DRAWINGS

Various embodiments of this disclosure that are proposed as examples will be described in detail with reference to the following figures, wherein like numerals reference like elements, and wherein:

FIGS. 10A and 10B show block diagrams of averaging filter examples 1000A and 1000B according to an embodiment of the disclosure;

DETAILED DESCRIPTION OF EMBODIMENTS

Figure 1:
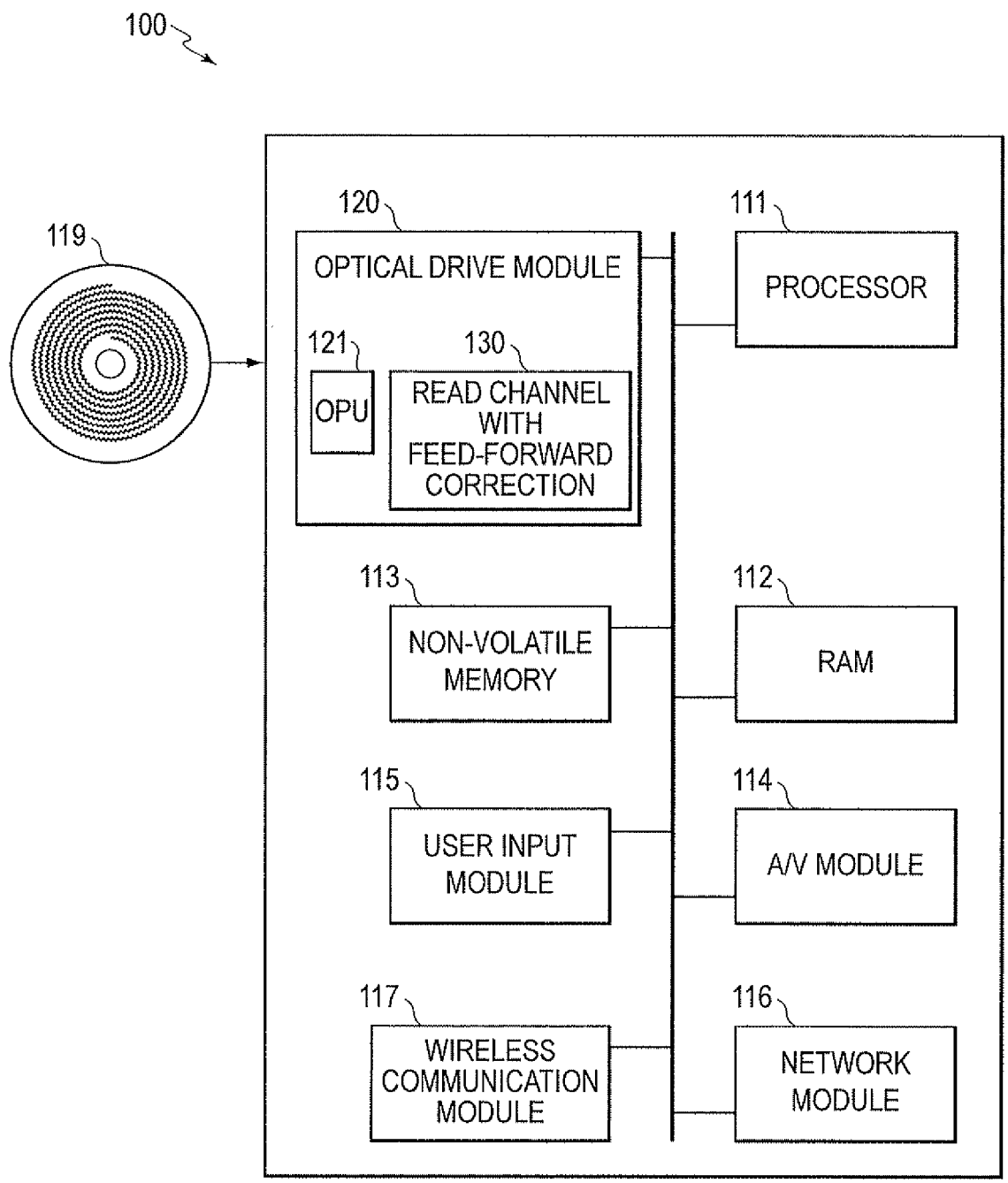
FIG. 1 shows a block diagram of a system example 100 and an optical disc example 119 according to an embodiment of the disclosure.

FIG. 1 shows a block diagram of a system example 100 and an optical disc example 119 according to an embodiment of the disclosure. The system 100 includes an optical drive module 120 that reads data from the optical disc 119.

The optical drive module 120 includes an optical pickup unit (OPU) 121, and a read channel 130 with feed-forward correction. The OPU 121 is configured to generate an electrical signal in response to information on the optical disc 119. Specifically, the OPU 121 directs a laser beam to a location of the optical disc 119. The laser beam is reflected from the location of the optical disc 119. A reflected laser beam has light properties that correspond to information stored at the location of the optical disc 119. The light properties are detected by a light detector (not shown) of the OPU 121. The light detector of the OPU 121 generates an electrical signal, generally in the analog form, in response to the reflected laser beam. The electrical signal is then processed by other components of the optical drive module 120, such as the read channel 130, to reproduce the information stored on the optical disc 119.

The read channel 130 includes a signal processing circuit (not shown). The signal processing circuit receives the electrical signal and processes the electrical signal. The electrical signal may have a profile that varies due to various reasons. In an example, a profile of the electrical signal includes an offset and an amplitude. The offset and the amplitude vary due to various reasons, such as a power variation of the laser beam, a reflectivity variation of the optical disc 119, fingerprint stains on the optical disc 119, and the like. Generally, the read channel 130 includes, for example, an offset and gain correction module, that adjusts parameters in the signal processing circuit, such that the offset and the amplitude of the processed electrical signal are maintained at a desired level(s).

According to an embodiment of the disclosure, the read channel 130 has a feed-forward correction module (not shown) that responds quickly to sudden profile variations, such as fingerprint-stain induced profile variations, and the like. In an example, the feed-forward correction module measures a signal profile, such as an offset and an amplitude of the electrical signal based on the electrical signal in a time window, and then introduces a profile correction, such as an offset correction and a gain correction, to at least one point, such as a center point, of the electrical signal in the time window. Then, when a sudden profile variation happens, a profile correction to correct the sudden profile variation is immediately applied to the electrical signal. Thus, the read channel 130 has a relatively fast response time to the sudden profile variation.

It is noted that the read channel 130 can include other correction modules. In an example, the read channel 130 includes a feedback offset control loop that adaptively adjusts an offset adjustment added to the electrical signal to compensate for an offset variation, and a gain feedback control loop that adaptively adjusts a gain of an amplifier that is used to amplify the electrical signal to compensate for an amplitude variation. Generally, small loop gains are preferred for the feedback offset and gain control loops to reduce channel noise and keep the loop stable. The small loop gains can result in a relatively slow response to sudden profile variations in the electrical signal, such as fingerprints stains on the optical disc 119. With the feed-forward correction module, the read channel 130 achieves fast response to the sudden profile variations.

It is noted that the offset and the amplitude of the electrical signal are not necessarily maintained at relatively constant values. Instead, the offset and the amplitude of the electrical signal are maintained at desired levels, such as within a range, and the like.

It is noted that the system 100 also includes other components, such as a processor 111, non-volatile memory 113, random access memory (RAM) 112, audio/video (A/V) module 114, user input module 115, network module 116, wireless communication module 117, and the like, to perform various functions during operation. These components are coupled together as shown in FIG. 1.

The processor 111 executes system and application codes. The non-volatile memory 113 holds information even when power is off. The non-volatile memory 113 can be used to store system and application codes, such as firmware. The RAM 112 is readable and writeable. Generally, the RAM 112 can have a relatively fast access speed. In an embodiment, the data and the codes are stored in the RAM 112 during operation, such that the processor 111 can access the RAM 112 for the codes and the data instead of the non-volatile memory 113.

The user input module 115 enables a user to control operations of the system 100. The user input module 115 includes any suitable user input device, such as a keyboard, mouse, touch screen, and the like. In addition, the user input module 115 can include an interface that couples external user input devices to the system 100.

The audio/video module 114 includes any suitable audio/video device, such as a microphone, speaker, display screen, and the like. In addition, the audio/video module 114 can include an interface that couples external audio and video devices to the system 100. The audio/video module 114 can be utilized to play audio/video data stored in the optical disc 119.

The network module 116 and the wireless communication module 117 enable the system 100 to transmit the data stored on the optical disc 119 to other devices, and to receive data from the other devices, and store the received data onto the optical disc 119.

For ease and clarity of description, the embodiments are presented with a bus architecture. However, it should be understood that any other architectures can be used to couple components within the system 100.

It is noted that the read channel 130 can be suitably implemented in other system that reads other suitable storage medium, such as holographic optical disc, magnetic storage, and the like.

Figure 2A:
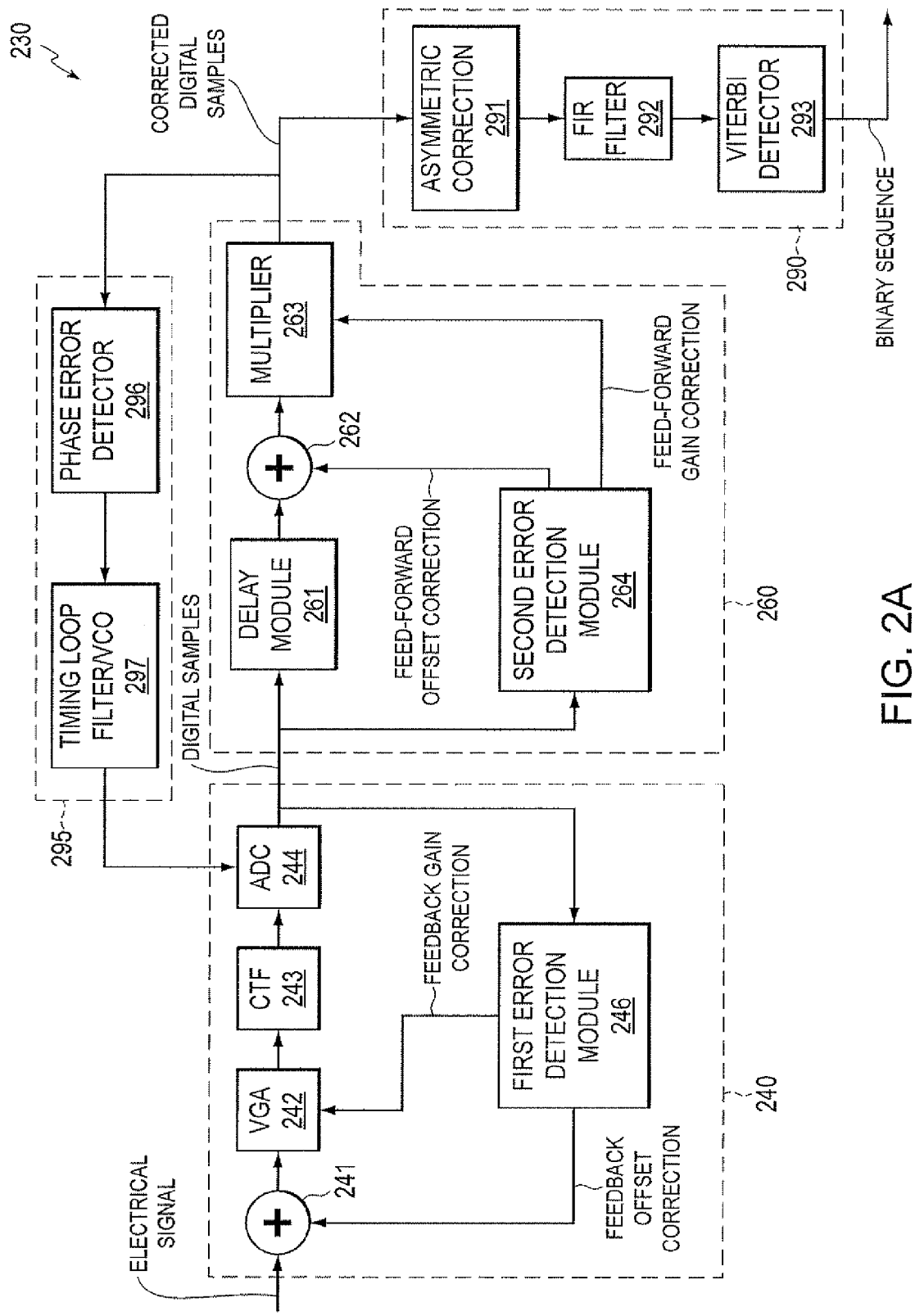
FIG. 2A shows a block diagram of a read channel example 230 according to an embodiment of the disclosure.

FIG. 2A shows a block diagram of a read channel example 230 according to an embodiment of the disclosure. The read channel 230 includes a front-end processing portion 240, a feed-forward correction module 260, a data detector 290, and a timing compensation module 295. These elements are coupled together as shown in FIG. 2A.

The front-end processing portion 240 receives the electrical signal and regulates the electrical signal using various techniques, such as amplification, offset adjustment, filtering, sampling, analog to digital converting, and the like. In an example, the front-end processing portion 240 includes a processing path, such as a first adder 241, a variable gain amplifier (VGA) 242, a continuous time filter (CTF) 243, and an analog to digital converter (ADC) 244, for processing the electrical signal. Specifically, the first adder 241 receives the electrical signal, adjusts an offset of the electrical signal, and provides the offset-adjusted electrical signal to the VGA 242. The VGA 242 amplifies the electrical signal with a gain that is adjustable, and provides the amplified electrical signal to the CTF 243. The CTF 243 filters the amplified electrical signal to remove high frequency noise to clean the electrical signal, and provides the filtered electrical signal to ADC 244. The ADC 244 samples the electrical signal, converts the samples of the electrical signal from an analog form to a digital form, and outputs digital samples of the electrical signal.

Further, the front-end processing portion 240 includes a first error detection module 246. The first error detection module 246 is coupled to the processing path to form a feedback control loop. Specifically, the first error detection module 246 receives the digital samples of the electrical signal from the ADC 244, generates a feedback offset correction and a feedback gain correction based on the digital samples of the electrical signal. The feedback-offset correction is provided back to the first adder 241 to adjust the offset of the electrical signal, and the feedback gain correction is provided back to the VGA 242 in order to adjust an amplitude of the electrical signal.

Generally, the feedback control loop adaptively compensates for offset errors and gain errors. The response time to obtain stabilized offset and amplitude by the feedback control loop depends on loop gains. In an embodiment, the feedback control loop is configured to have relatively small loop gains in order to reduce channel noise and keep the loop stable. The small loop gains can result in a relatively slow response to a sudden profile variation, such as a profile variation induced by fingerprint stains, and the like.

According to an aspect of the disclosure, the feed-forward correction module 260 detects a profile variation, and applies the corrections in response to the profile variation forward into the electrical signal, such that a response time to the profile variation is reduced.

In an embodiment, the feed-forward correction module 260 detects a profile variation based on a number of digital samples, determines corrections in response to the profile variation, applies the corrections forward to at least one of the digital samples, and outputs corrected digital samples. Thus, the feed-forward correction module 260 responds quickly to sudden profile variations, such as the profile variation induced by fingerprints stains, and the like.

In an embodiment, the feed-forward correction module 260 includes a delay module 261, a second adder 262, a multiplier 263, and a second error detection module 264. The second error detection module 264 receives the digital samples, and detects a profile variation, such as an offset variation, an amplitude variation based on the digital samples. Further, the second error detection module 264 generates a feed-forward offset correction for offset adjustment, and a feed-forward gain correction for amplitude adjustment. The delay module 261 receives the digital samples, and adds a delay in the digital samples, and provides the delayed digital samples to the second adder 262. The second adder 262 adds the feed-forward offset correction to a delayed digital sample, and provides the offset-adjusted digital sample to the multiplier 263. The multiplier 263 receives the offset-adjusted digital sample, and multiplies the offset-adjusted digital sample with the feed-forward gain correction to adjust an amplitude of the digital sample.

In an embodiment, the feed-forward correction module 260 operates based on a time window. Specifically, the second error detection module 264 detects the profile variation based on the digital samples in a time window, and generates the feed-forward offset correction and the feed-forward gain correction based on the digital samples in the time window. The delay module 261 suitably delays the digital samples, such that a digital sample in the time window is offset-adjusted by the second adder 262 and is amplitude-adjusted by the multiplier 263.

In an example, a time window includes 16 digital samples. The second error detection module 264 detects the profile variation based on the 16 digital samples, and generates the feed-forward offset correction and the feed-forward gain correction based on 16 digital samples. The delay module 261 delays the digital samples by 8, such that a center digital sample, such as the $9^{th}$ digital sample of the 16 digital samples, is offset-adjusted by the second adder 262, and is amplitude-adjusted by the multiplier 263. Because the corrections are fed-forward to the digital samples, a relatively short response time to the sudden profile variation is achieved.

The data detector 290 detects a binary sequence from the corrected digital samples. In an embodiment, the data detector 290 includes an 291 for correcting asymmetric amplitudes in the corrected digital samples, a finite impulse response (FIR) filter 292 for removing noises from the corrected digital samples and control inter-symbol interference, and a Viterbi detector 293 for detecting the binary sequence.

The timing compensation module 295 is configured to detect and correct timing errors. In an embodiment, the timing compensation module 295 includes a phase error detector 296 for detecting a phase error, and a timing loop filter/VCO 297 for generating sampling clocks based on the detected phase error.

Figure 2B:
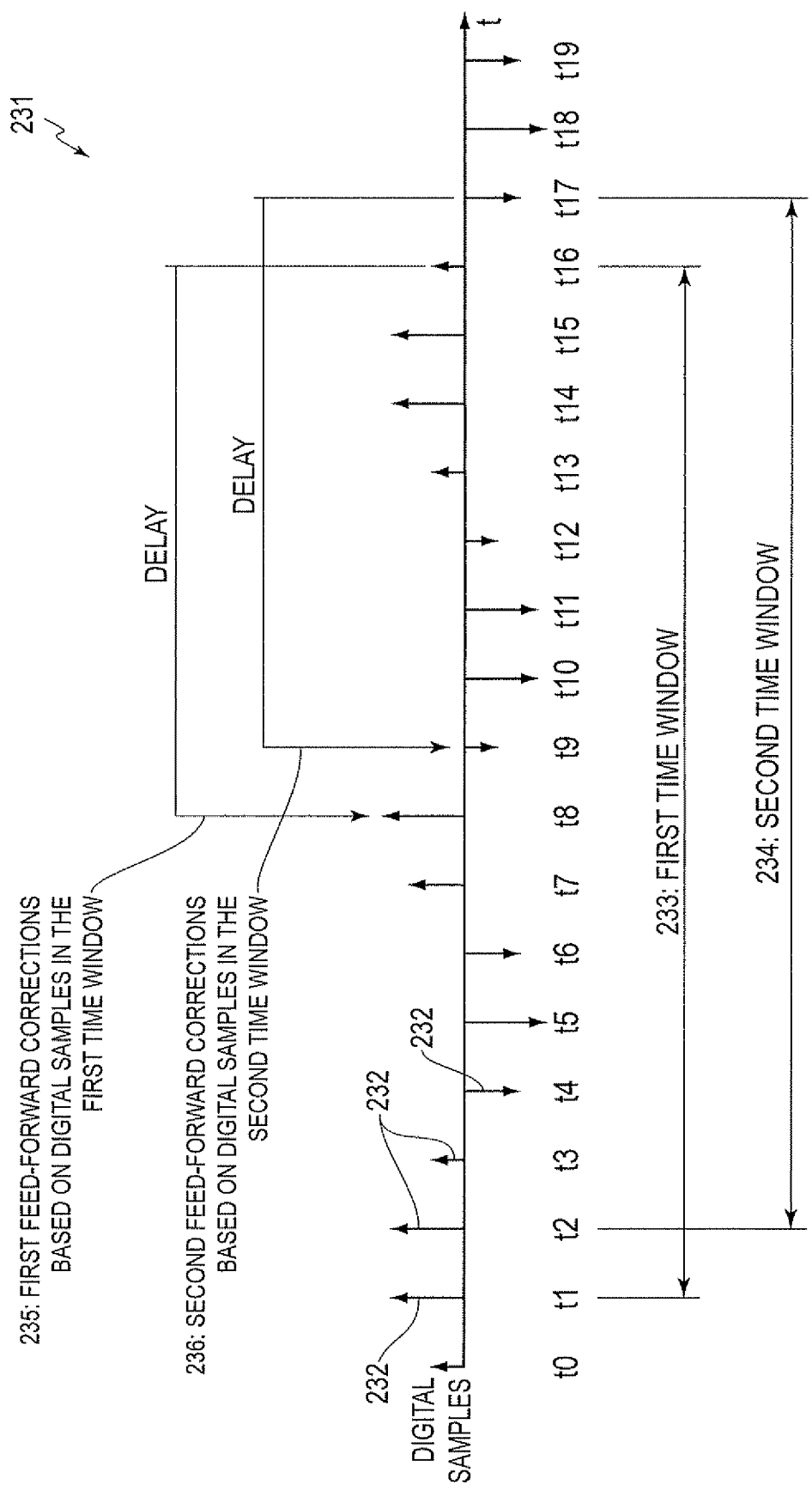
FIG. 2B shows a plot 231 for feed-forward correction according to an embodiment of the disclosure.

FIG. 2B shows a plot 231 for feed-forward correction according to an embodiment of the disclosure. The plot 231 shows a sequence of digital samples 232 with regard to the sampling time t. Further, the plot 231 shows a first time window 233 from t1 to t16, and a second time window 234 from t2 to t17. Based on digital samples in the first time window 233, first feed-forward corrections 235 are determined. The first feed-forward corrections 235 are applied to a digital sample at t8, t8 is delayed to t16 by 261 by 8 sampling intervals. Based on digital samples in the second time window 234, second feed-forward corrects 236 are determined. The second feed-forward corrections 236 are applied to a digital sample at t9, which is delayed to t17 by 261 by 8 sampling intervals.

Figure 3A:
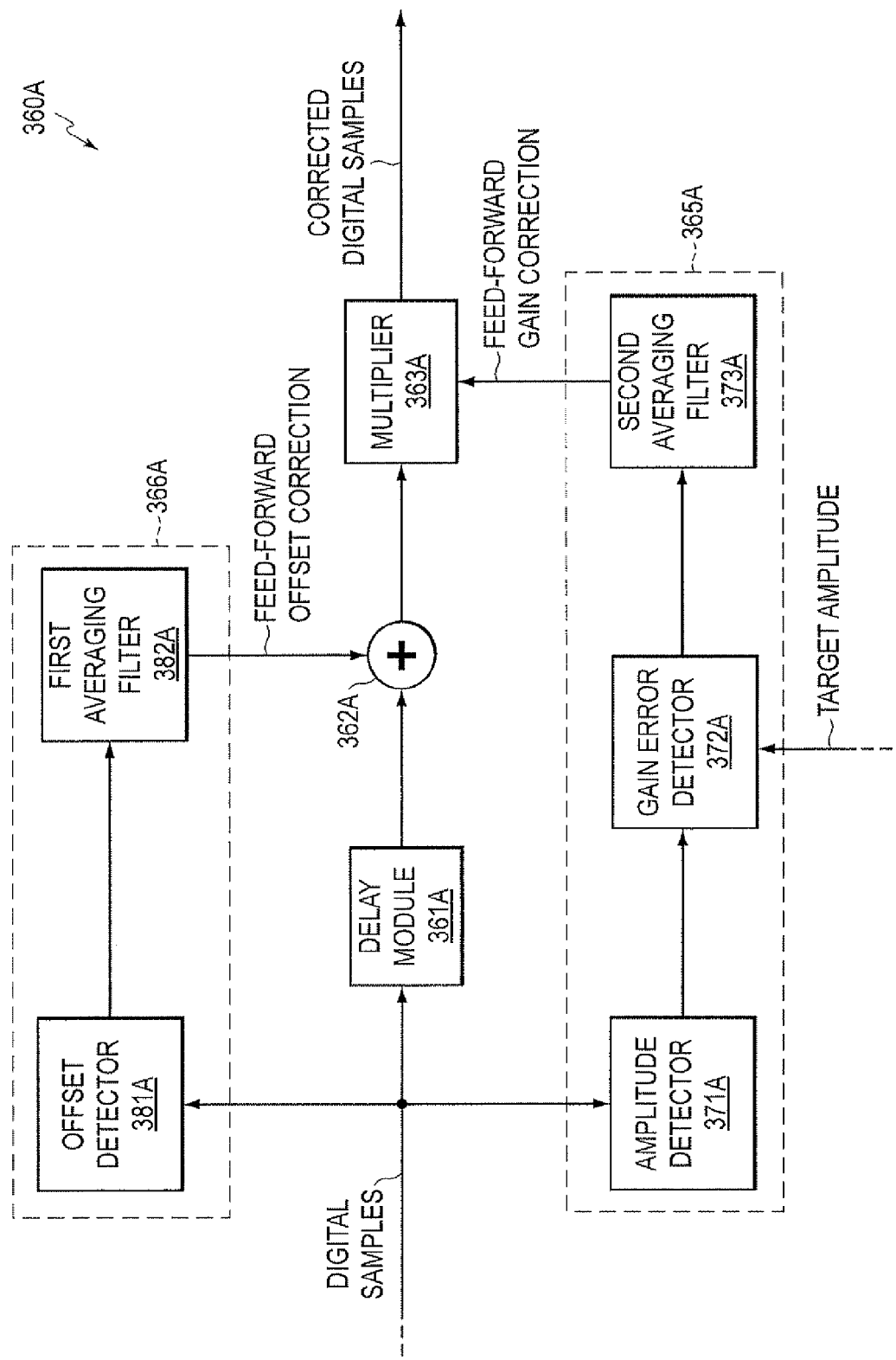
FIG. 3A shows a block diagram of a feed-forward correction module example 360A according to an embodiment of the disclosure.

FIG. 3A shows a block diagram of a feed-forward correction module 360A according to an embodiment of the disclosure. The feed-forward correction module 360A includes a delay module 361A, an adder 362A, a multiplier 363A, an offset correction generation module 366A, and a gain correction generation module 365A. These elements are coupled together as shown in FIG. 3A.

The delay module 361A receives a sequence of digital samples, and adds a delay to digital samples, and provides the delayed digital samples to the adder 362A. The adder 362A adds a feed-forward offset correction to a delayed digital sample, and provides the offset-adjusted digital sample to the multiplier 363A. The multiplier 363A receives the offset-adjusted digital sample, and multiplies the offset-adjusted digital sample with a feed-forward gain correction to adjust an amplitude of the digital sample.

The offset correction generation module 366A receives the sequence of digital samples and generates the feed-forward offset correction based on the digital samples. In an embodiment, the offset correction generation module 366A includes an offset detector 381A and a first averaging filter 382A. The offset detector 381A receives the digital samples, and detects offset errors. The offset errors are provided to the first averaging filter 382A. The first averaging filter 382A calculates an average of the offset errors. In an embodiment, the first averaging filter 382A calculates the average based on a time window. The average is provided to the adder 362A as the feed-forward offset correction.

The gain correction generation module 365A receives the sequence of digital samples and generates the feed-forward gain correction based on the digital samples. In an embodiment, the gain correction generation module 365A includes an amplitude detector 371A, a gain error detector 372A and a second averaging filter 373A. The amplitude detector 371A receives the digital samples, and detect amplitudes based on the digital samples. The gain error detector 372A receives the amplitudes, and detects gain errors based on the amplitudes and a target amplitude. In an example, the gain error detector 372A includes a multiplier that multiplies inverses of the amplitudes with the target amplitude to calculate the gain errors. The gain errors are provided to the second averaging filter 373A. The second averaging filter 373A calculates an average of the gain errors. In an embodiment, the second averaging filter 373A calculates the average based on a time window. The average is provided to the multiplier 363A as the feed-forward gain correction.

Figure 3B:
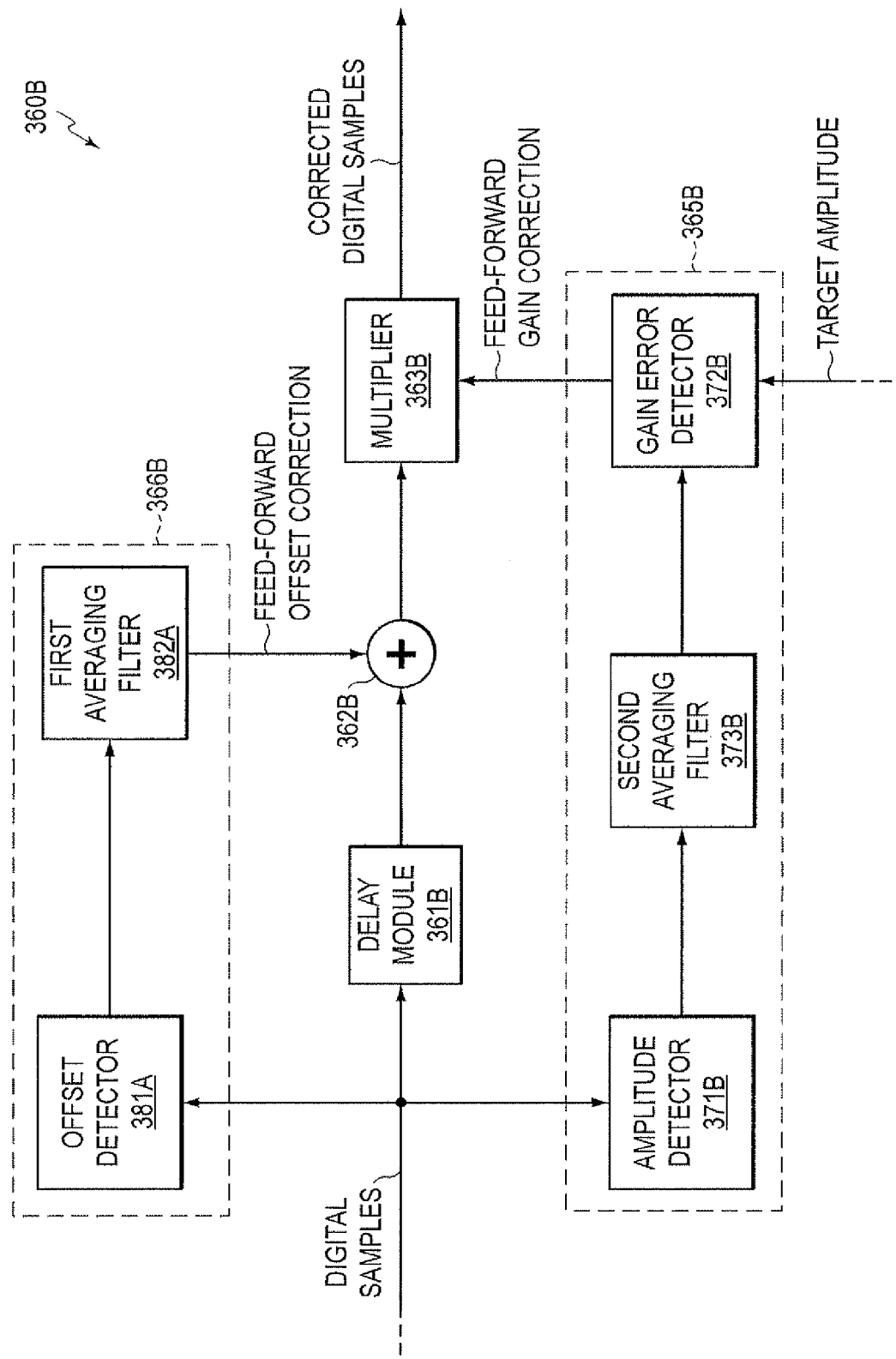
FIG. 3B shows a block diagram of a feed-forward correction module example 360B according to an embodiment of the disclosure.

FIG. 3B shows a block diagram of a feed-forward correction module 360B according to an embodiment of the disclosure. The feed-forward correction module 360B utilizes certain components that are identical or equivalent to those used in the feed-forward correction module 360A; the description of these components has been provided above and will be omitted here for clarity purposes. However, in the gain correction generation module 365B, the amplitude detector 371B provides the detected amplitudes to the second averaging filter 373B. The second averaging filter 373B calculates an average amplitude based on the received detected amplitudes. In an embodiment, the second averaging filter 373B calculates the average amplitude based on a time window. The average amplitude is provided to the gain error detector 372B. The gain error detector 372B detects a gain error based on the average amplitude and a target amplitude. In an example, the gain error detector 372B includes a multiplier (not shown) that multiples an inverse of the average amplitude with the target amplitude. The gain error is provided to the multiplier 363B as the feed-forward gain correction to adjust the amplitude of the digital samples.

Figure 4:
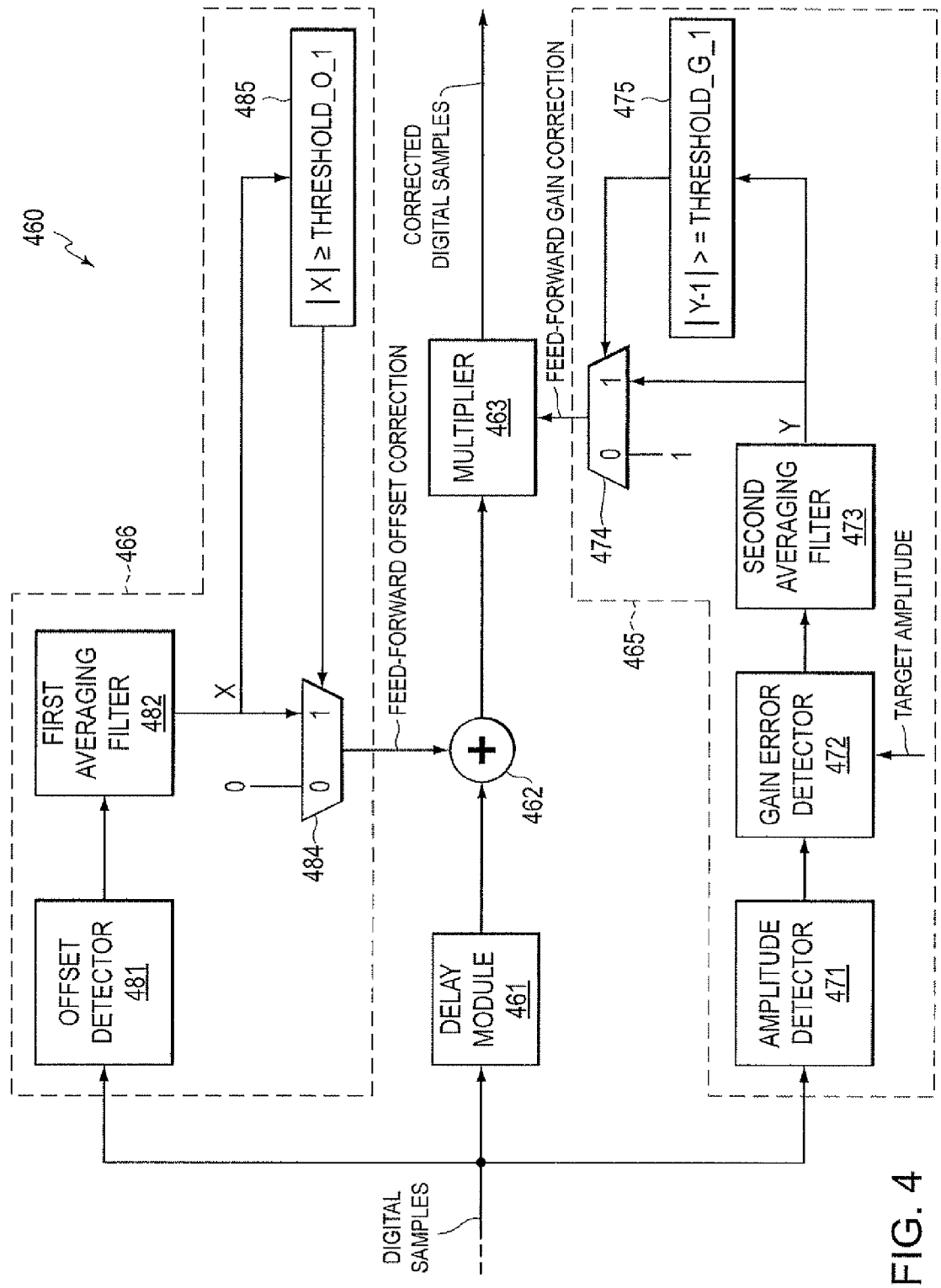
FIG. 4 shows a block diagram of a feed-forward correction module example 460 according to an embodiment of the disclosure.

FIG. 4 shows a block diagram of a feed-forward correction module example 460 according to an embodiment of the disclosure. The feed-forward correction module 460 utilizes certain components that are identical or equivalent to those used in the feed-forward correction module 360A; the description of these components has been provided above and will be omitted here for clarity purposes.

In an embodiment, the offset correction generation module 466 includes additional components, such as a first multiplexer 484 and a first multiplexer controller 485 as shown in FIG. 4. The first multiplexer controller 485 receives the average of the offset errors (X), compares an absolute value of the average of the offset errors (|X|) to a first offset threshold (THRESHOLD_O_1), and controls the first multiplexer 484 based on the comparison. In an example, |X| has a relatively large value due to a sudden profile variation. When |X| is larger than or equal to the first offset threshold, the first multiplexer controller 485 controls the first multiplexer 484 to select the average of the offset errors (X) and provides the average of the offset errors (X) to the adder 462 as the feed-forward offset correction. In another example, |X| has a relatively small value due to channel noise. When |X| is smaller than the first offset threshold, the first multiplexer controller 485 controls the first multiplexer 484 to select value zero, such that the adder 462 does not adjust the offset of the digital samples.

Similarly, in an embodiment, the gain correction generation module 465 includes additional components, such as a second multiplexer 474 and a second multiplexer controller 475 shown in FIG. 4. The second multiplexer controller 475 receives the average of the gain errors (Y), subtracts a nominal gain value (1) from the average of the gain errors (Y−1), calculates an absolute value (|Y−1|), and compares the absolute value (|Y−1|) to a first gain threshold (THRESHOLD_G_1), and controls the second multiplexer 474 based on the comparison. In an example, |Y−1 has a relatively large value due to a sudden profile variation. When |Y−1| is larger than or equal to the first gain threshold, the second multiplexer controller 475 controls the second multiplexer 474 to select the average of the gain errors (Y) and provides the average of the gain errors (Y) to the multiplier 463 as the feed-forward gain correction. In another example, |Y−1| has a relatively smaller value due to channel noise. When |Y−1| is smaller than the first gain threshold, the second multiplexer controller 475 controls the second multiplexer 474 to select value 1, such that the multiplier 463 does not adjust the amplitude of the digital samples.

Figure 5:
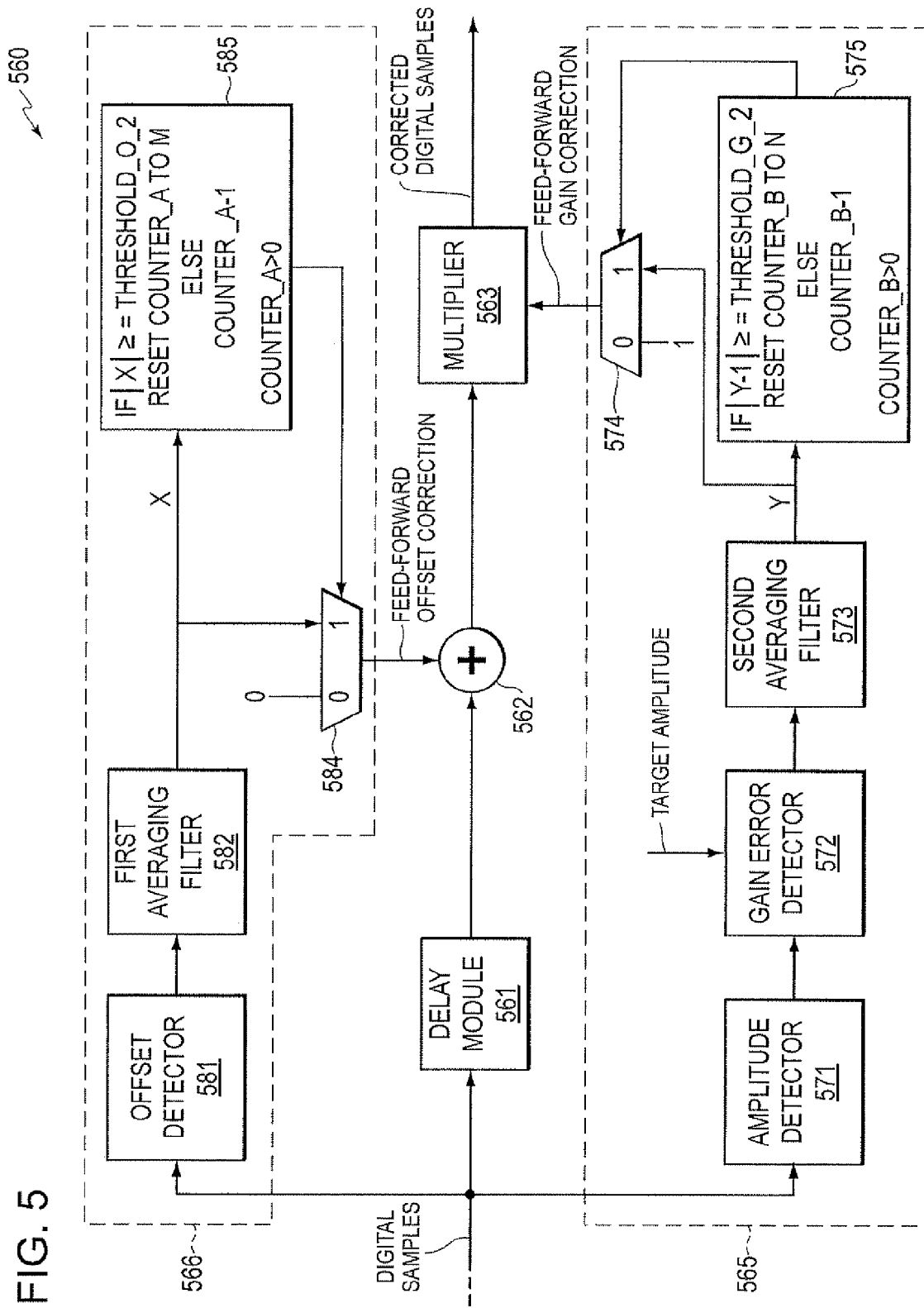
FIG. 5 shows a block diagram of a feed-forward correction module example 560 according to an embodiment of the disclosure.

FIG. 5 shows a block diagram of a feed-forward correction module example 560 according to an embodiment of the disclosure. The feed-forward correction module 560 utilizes certain components that are identical or equivalent to those used in the feed-forward correction module 460; the description of these components has been provided above and will be omitted here for clarity purposes.

In an embodiment, the first multiplexer controller 585 includes a COUNTER_A. The first multiplexer controller 585 controls the first multiplexer 584 based on the COUNTER_A. In an example, when |X| calculated based on a time window is larger than or equal to a second offset threshold (THRESHOLD_O_2), the first multiplexer controller 585 resets the COUNTER_A to M. M is a positive integer number. When |X| calculated based on a time window is smaller than the first offset threshold, the COUNTER_A counts down by one. When the COUNTER_A is larger than zero, the first multiplexer controller 585 controls the first multiplexer 584 to select the average of the offset errors (X) and provides the average of the offset errors (X) to the adder 562 as the feed-forward offset correction. When the COUNTER_A is smaller or equal to zero, the first multiplexer 584 outputs value zero, such that the adder 562 does not adjust the offset of the digital samples. Thus, in this embodiment, when |X| exceeds the second offset threshold, feed-forward offset correction based on X is applied in the signal processing. The feed-forward offset correction based on X is continuously applied in the signal processing until |X| is smaller than the second offset threshold for a period of time, such as M sampling intervals in this embodiment. In an example, a profile variation has a tail portion that |X| of the tail portion is relatively small, such as smaller than the second offset threshold. According to this embodiment, the feed-forward offset correction based on the tail portion can be suitably applied in the signal processing.

Similarly, in an embodiment, the second multiplexer controller 575 includes a COUNTER_B. The second multiplexer controller 575 controls the second multiplexer 574 based on the COUNTER_B. In an example, when |Y−1| calculated based on a time window is larger than or equal to a second gain threshold (THRESHOLD_G_2), the second multiplexer controller 575 resets the COUNTER_B to N. N is a positive integer number. When |Y−1| calculated based on a time window is smaller than the second gain threshold, the COUNTER_B counts down by one. When the COUNTER_B is larger than zero, the second multiplexer controller 575 controls the second multiplexer 574 to select the average of the gain errors (Y) and provides the average of the gain errors (Y) to the multiplier 563 as the feed-forward gain correction. When the COUNTER_B is smaller or equal to zero, the second multiplexer 574 outputs value 1, such that the multiplier 563 does not adjust the amplitude of the digital samples. Thus, in this embodiment, when |Y−1| exceeds the second gain threshold, feed-forward gain correction based on Y is applied in the signal processing. The feed-forward gain correction based on Y is continuously applied in the signal processing until |Y−1| is smaller than the second gain threshold for a period of time, such as N sampling intervals in this embodiment. In an example, a profile variation has a tail portion that |Y−1| of the tail portion is relatively small, such as smaller than the second gain threshold. According to this embodiment, the feed-forward gain correction based on the tail portion can be suitably applied in the signal processing.

Figure 6:
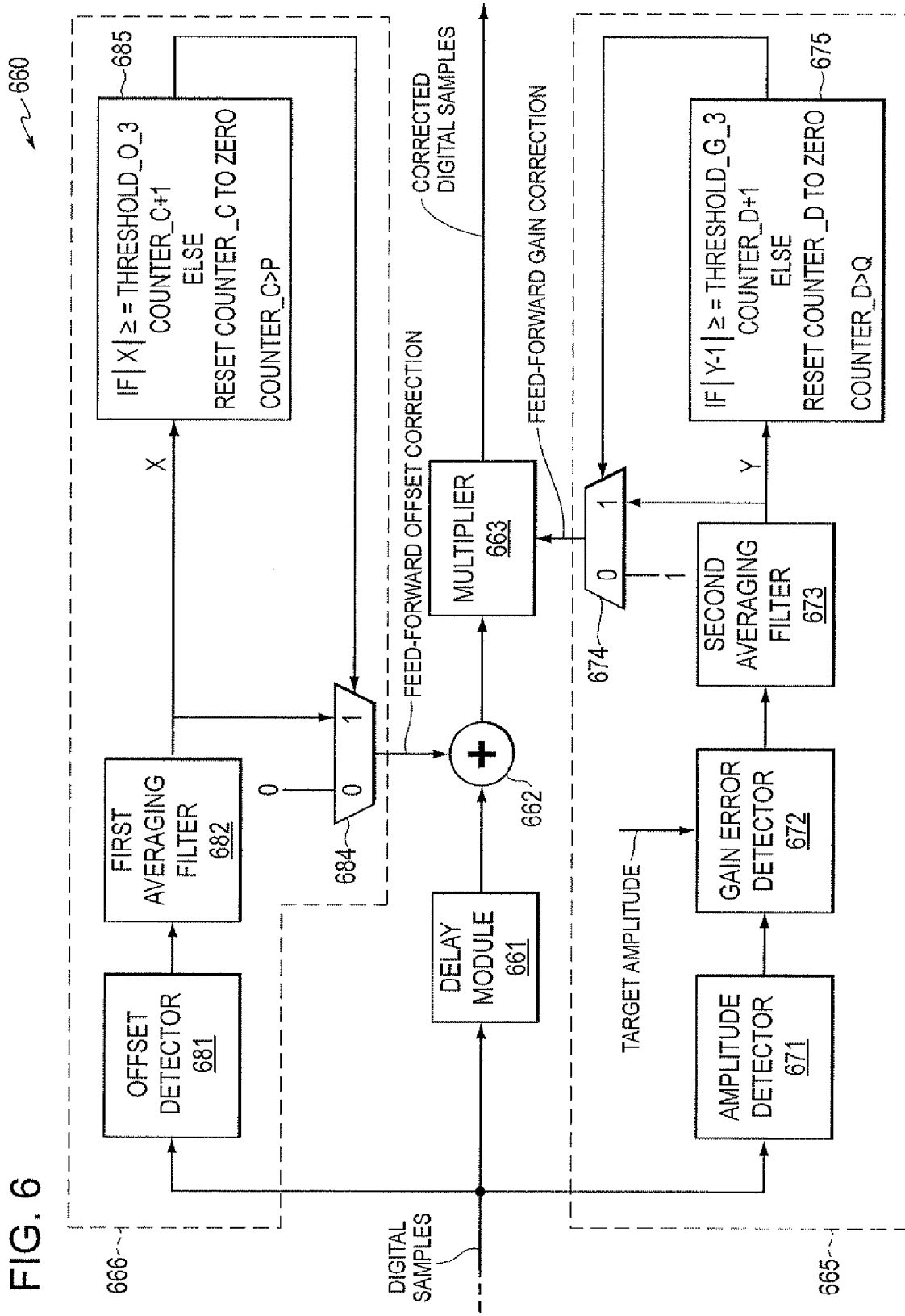
FIG. 6 shows a block diagram of a feed-forward correction module example 660 according to an embodiment of the disclosure.

FIG. 6 shows a block diagram of a feed-forward correction module example 660 according to an embodiment of the disclosure. The feed-forward correction module 660 utilizes certain components that are identical or equivalent to those used in the feed-forward correction module 360A; the description of these components has been provided above and will be omitted here for clarity purposes.

In an embodiment, the first multiplexer controller 685 includes a COUNTER_C. The first multiplexer controller 685 controls the first multiplexer 684 based on the COUNTER_C. In an example, when |X| calculated based on a time window is smaller than a third offset threshold (THRESHOLD_O_3), the COUNTER_C is reset to zero. When |X| calculated based on a time window is larger than or equal to the third offset threshold, the COUNTER_C counts up by one. When the COUNTER_C is larger than P (P is a positive value), the first multiplexer 684 selects the average of the offset errors (X) and provides the average of the offset errors (X) to the adder 662 as the feed-forward offset correction. When the COUNTER_C is smaller than P, the first multiplexer 684 outputs value zero, such that the adder 662 does not adjust the offset of the digital sample.

In an example, channel noises, such as noises in the offset detector 681, can cause |X| to occasionally exceed the third offset threshold. When |X| exceeds the third offset threshold for a time period that is smaller than P sampling intervals, for example, the offset error is considered as noise, and no feed-forward offset correction is applied in the signal processing; and when |X| exceeds the third offset threshold for a time period, such as P sampling intervals, for example, feed-forward offset correction based on X starts to be applied in the signal processing.

Similarly, in an embodiment, the second multiplexer controller 675 includes a COUNTER_D. The second multiplexer controller 675 controls the second multiplexer 674 based on the COUNTER_D. In an example, when |Y−1| calculated based on a time window is smaller than or equal to a third gain threshold (THRESHOLD_G_3), the second multiplexer controller 675 resets the COUNTER_D to zero. When |Y−1| calculated based on a time window is larger than or equal to the third gain threshold, the COUNTER_D counts up by one. When the COUNTER_D is larger than Q (Q is a positive value), the second multiplexer 674 selects the average of the gain errors (Y) and provides the average of the gain errors (Y) to the multiplier 663 as the feed-forward gain correction. When the COUNTER_D is smaller or equal to zero, the second multiplexer 674 outputs value 1, such that the multiplier 663 does not adjust the amplitude of the digital sample.

In an example, channel noises, such as noises in the amplitude detector 671, can cause |Y−1| to occasionally exceed the third gain threshold. When |Y−1| exceeds the third gain threshold for a time period that is smaller than Q sampling intervals, for example, the offset error is considered as noise, and no feed-forward gain correction is applied in the signal processing; and when |Y−1| exceeds the third gain threshold for a time period, such as Q sampling intervals, for example, feed-forward gain correction based on Y starts to be applied in the signal processing.

Figure 7:
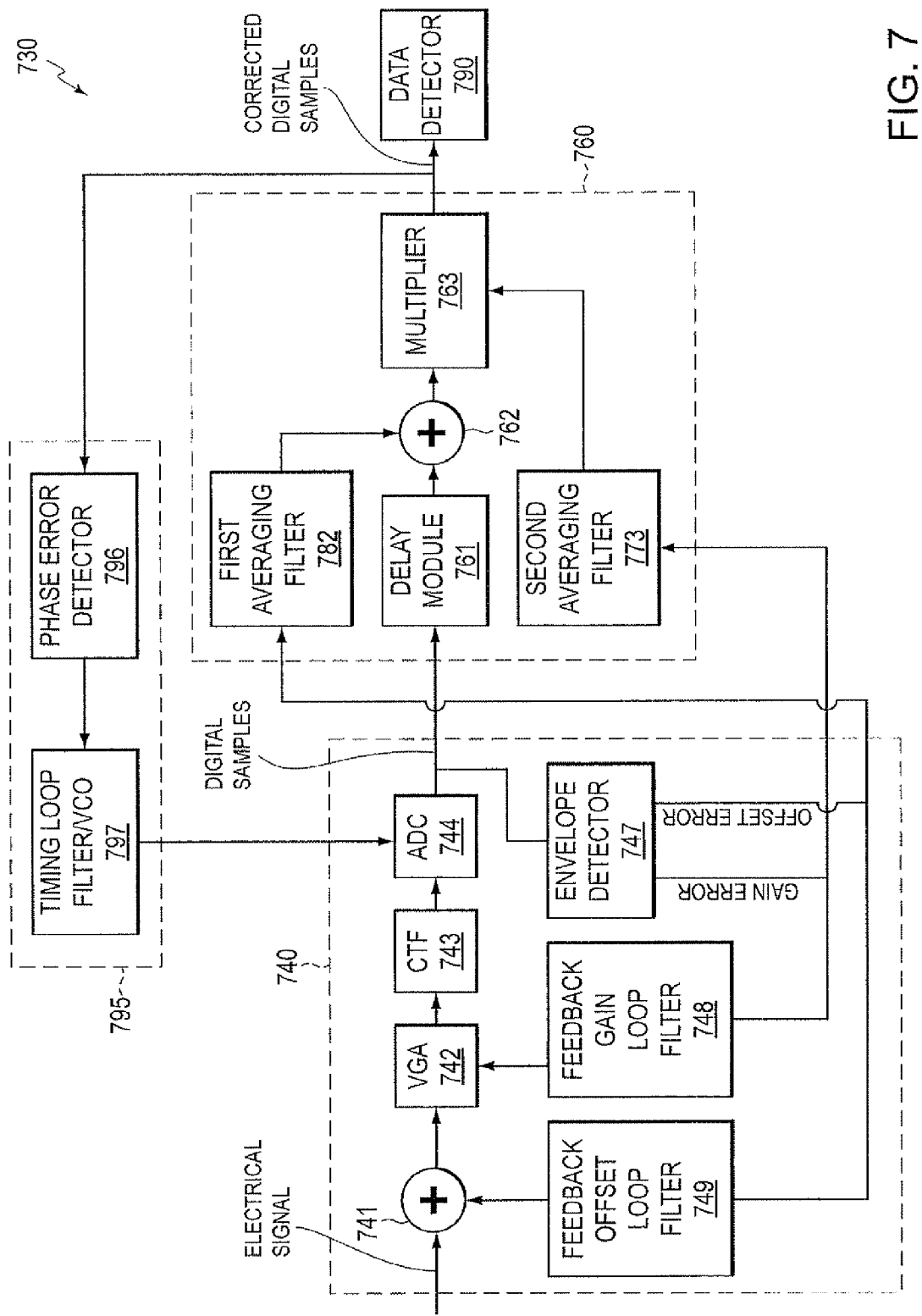
FIG. 7 shows a block diagram of a read channel example 730 according to an embodiment of the disclosure.

FIG. 7 shows a block diagram of a read channel example 730 according to an embodiment of the disclosure. The read channel 730 utilizes certain components that are identical or equivalent to those used in the read channel 230; the description of these components has been provided above and will be omitted here for clarity purposes.

In the FIG. 7 example, the front-end processing portion 740 includes an envelope detector 747 to detect a profile variation, such as an offset variation, an amplitude variation, and the like. The envelope detector 747 receives the digital samples, and detects an envelope of the digital samples, and further detects variation of the envelope. Based on the variation of the envelope, the envelope detector 747 generates an offset error, and a gain error. The offset error is provided to the feedback offset loop filter 749 to generate feedback offset correction, and is provided to the first averaging filter 782 to generate the feed-forward offset correction. The gain error is provided to the feedback offset loop filter 748 to generate the feedback offset correction, and is provided to the second average filter 773 to generate the feed-forward gain correction.

Figure 8:
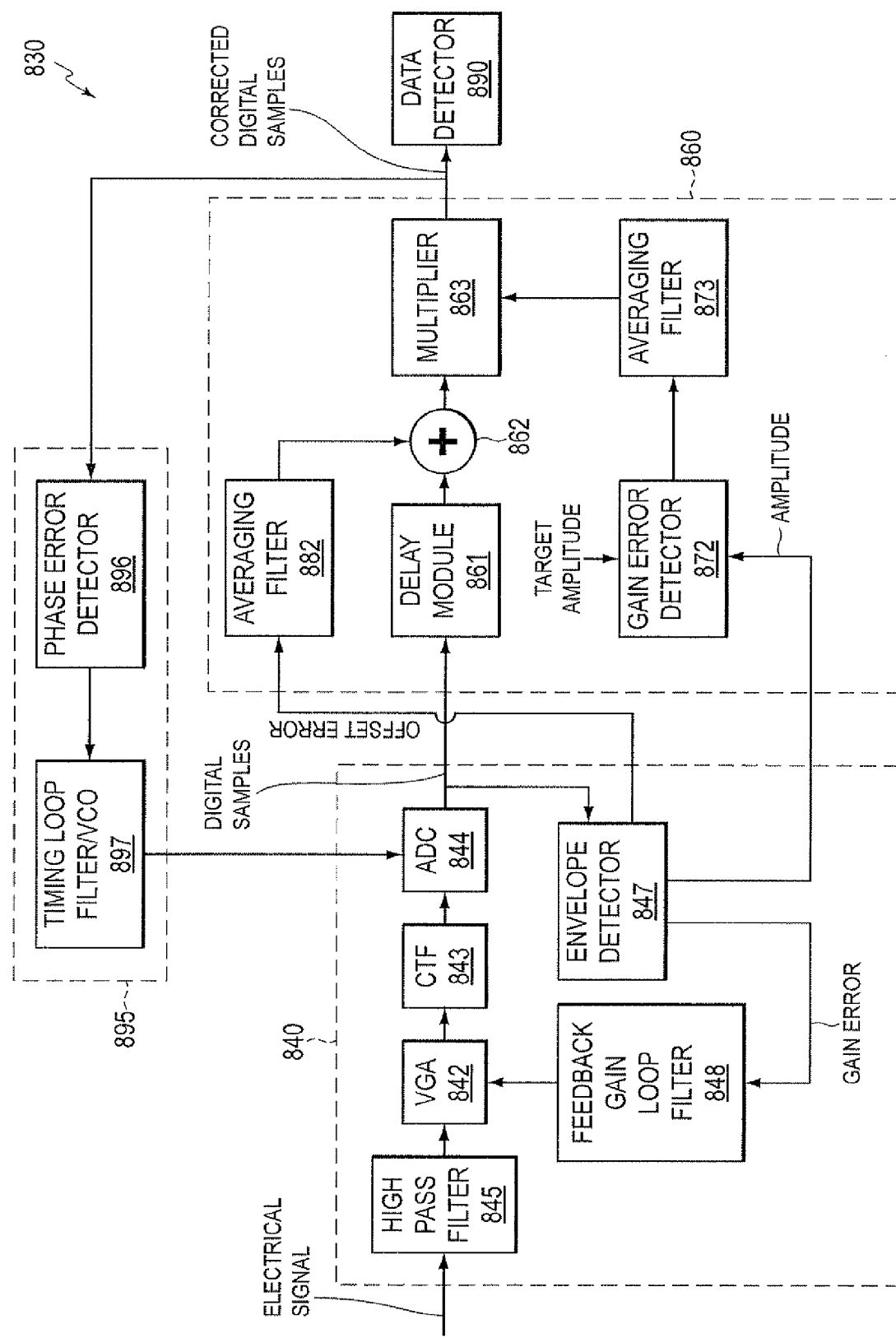
FIG. 8 shows a block diagram of a read channel example 830 according to an embodiment of the disclosure.

FIG. 8 shows a block diagram of a read channel example 830 according to an embodiment of the disclosure. The read channel 830 utilizes certain components that are identical or equivalent to those used in the read channel 730; the description of these components has been provided above and will be omitted here for clarity purposes.

In the FIG. 8 example, a front-end processing portion 840 is in an AC coupled configuration. Specifically, the front-end processing portion 840 includes a high pass filter 845. The high pass filter 845 removes relatively slow offset variation from the electrical signal. Thus, the feedback-offset correction is not needed. However, in an example, the high pass filter 845 does not respond to short term offset variations, such as offset variations due to fingerprints, and the like. In the FIG. 8 example, the envelope detector 847 detects an amplitude based on the envelope of the digital samples. The amplitude is provided to the gain error detector 872. The gain error detector 872 detects gain error based on the amplitude and a target amplitude. The gain error is provided to the second averaging filter 873 to generate the feed-forward gain correction.

It is noted that the read channel 730 and the read channel 830 can be suitably modified according to the feed-forward correction modules shown in FIGS. 4-6.

Figure 9:
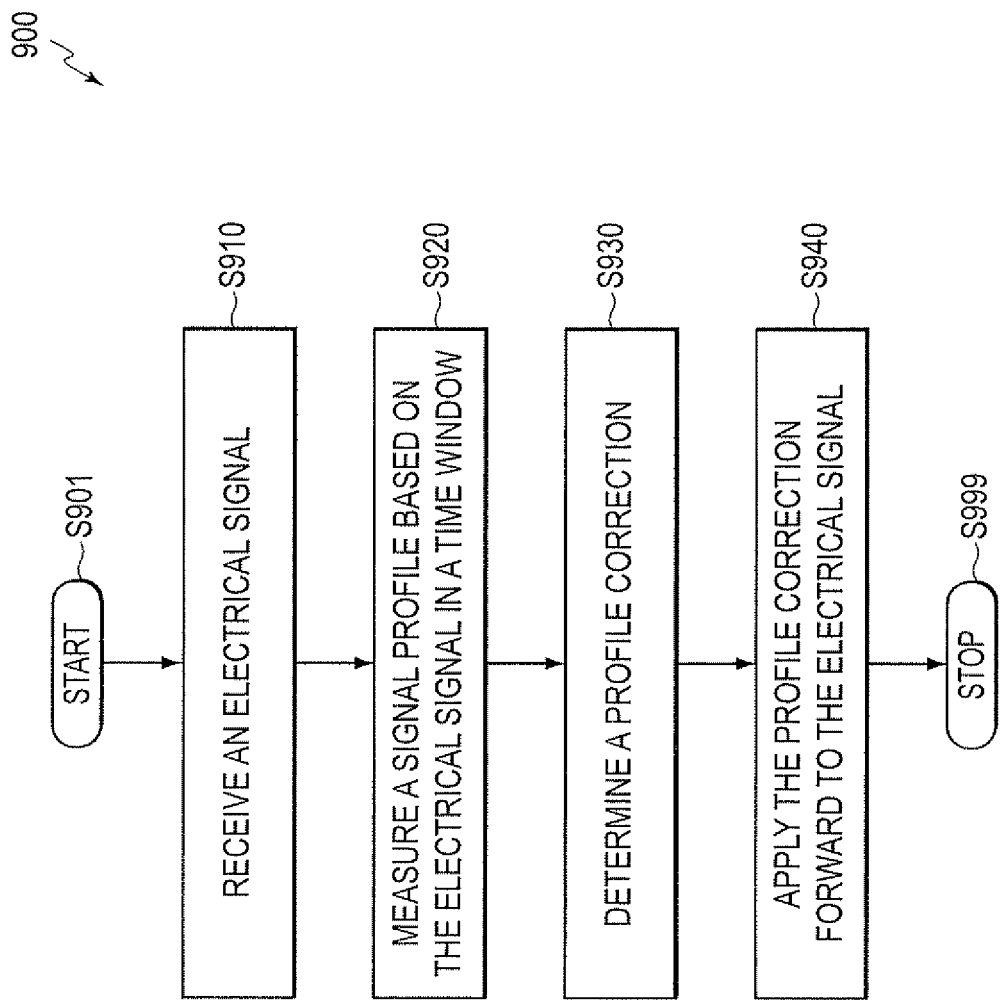
FIG. 9 shows a flow chart outlining a process example 900 according to an embodiment of the disclosure.

FIG. 9 shows a flow chart outlining a process example 900 for a read channel to compensate for sudden profile variations in an electrical signal according to an embodiment of the disclosure. The process starts at S901, and proceeds to S910.

At S910, the read channel receives the electrical signal. In an embodiment, the read channel includes a front-end processing portion to process the electrical signal. In an example, the front-end processing portion includes a feedback loop that is configured to adaptively correct variations in the electrical signal. Further, the front-end processing portion includes an analog-to-digital converter that is configured to sample the electrical signal, and convert the sampled electrical signal to digital samples.

At S920, the read channel measures a signal profile and detects a profile variation based on the electrical signal in a time window. In an embodiment, the read channel includes a feed-forward correction module. The feed-forward correction module measures offsets and amplitudes based on the digital samples, and calculates offset errors and gain errors. Further, in an embodiment, the feed-forward correction module calculates an average of the offset errors and an average of the gain errors in the time window.

At S930, the read channel determines a profile correction. In an embodiment, the feed-forward correction module includes a controller. The controller determines the profile correction based on the average of the offset errors and the average of the gain errors. In an example, the controller determines that the errors are due to noise (e.g., by comparing the averages of the offset errors and gain errors to the first offset threshold and the first gain threshold, as shown in FIG. 4, or by comparing the averages of the offset errors and gain errors to the third offset threshold and gain threshold, as shown in FIG. 6), and do not need correction. In another example, the controller determines that the errors are due to a sudden profile variation, and need a profile correction. In another example, the controller determines to correct a sudden profile variation in a hysteresis manner. For example, the controller determines to correct the sudden profile variation when the sudden profile variation has been continuously detected for a while (e.g., in the FIG. 6 example). In another example, the controller determines to continuously correct the sudden profile variation for a while when a sudden profile variation is detected (e.g., in the FIG. 5 example).

At S940, the read channel applies the profile correction forward to the electrical signal. In an embodiment, when a sudden profile variation is detected based on the electrical signal in a time window, the profile correction is applied to the electrical signal, such as a digital sample of the electrical signal, in the time window. In an embodiment, the read channel includes a delay module. The delay module delays the digital samples, such that the profile correction is applied to a digital sample in the time window. The process then proceeds to S999 and terminates.

FIG. 10A shows a block diagram of an averaging filter example 1000A according to an embodiment of the disclosure. The averaging filter 1000A includes a delay module 1001, an adder 1002, a buffer 1003, and a scaling module 1004. These elements are coupled together as shown in FIG. 10A.

The averaging filter 1000A calculates an average of digital inputs in a time window. The time window is defined by a specific delay of the delay module 1001. Specifically, the delay module 1001 receives a sequence of digital inputs, and delays the sequence by the time window. The adder 1002 and the buffer 1003 operate together to add up the sequence of the digital inputs, and subtract the delayed sequence of the digital inputs. Thus, the buffer 1003 outputs a sequence of values corresponding to sums of the digital inputs based on the time window. The scaling module 1004 scales the sums by an inverse of the specific delay, and outputs averages of digital inputs based on the time window.

FIG. 10B shows a block diagram of an averaging filter example 1000E according to an embodiment of the disclosure. The averaging filter 1000B includes a first adder 1011, a buffer 1012, a second adder 1013, a delay module 1015 and a scaling module 1014. These elements are coupled together as shown in FIG. 10B.

The averaging filter 1000B calculates an average of digital inputs in a time window. The time window is defined by a specific delay in the delay module 1015. Specifically, the adder 1011 and the buffer 1012 operate together to add up the sequence of the digital inputs, and the buffer 1012 outputs a sequence of values corresponding to sums of the digital inputs. The delay module 1015 delays the sequence of values by the time window. The second adder 1013 subtracts the sequence of values with the delayed sequence of values, thus the adder 1013 outputs sums of the digital inputs based on the time window. The scaling module 1014 scales the sums by an inverse of the specific delay, and outputs averages of digital inputs based on the time window.

It is noted that the averaging filters 1000A and 1000B are two filter examples. Any other suitable low pass filter, such as finite impulse response (FIR) filter, infinite impulse response (IIR) filter, and the like, can be used in the place of the averaging filters in FIGS. 3A, 3B, 4, 5, 7 and 8.

Figure 11:
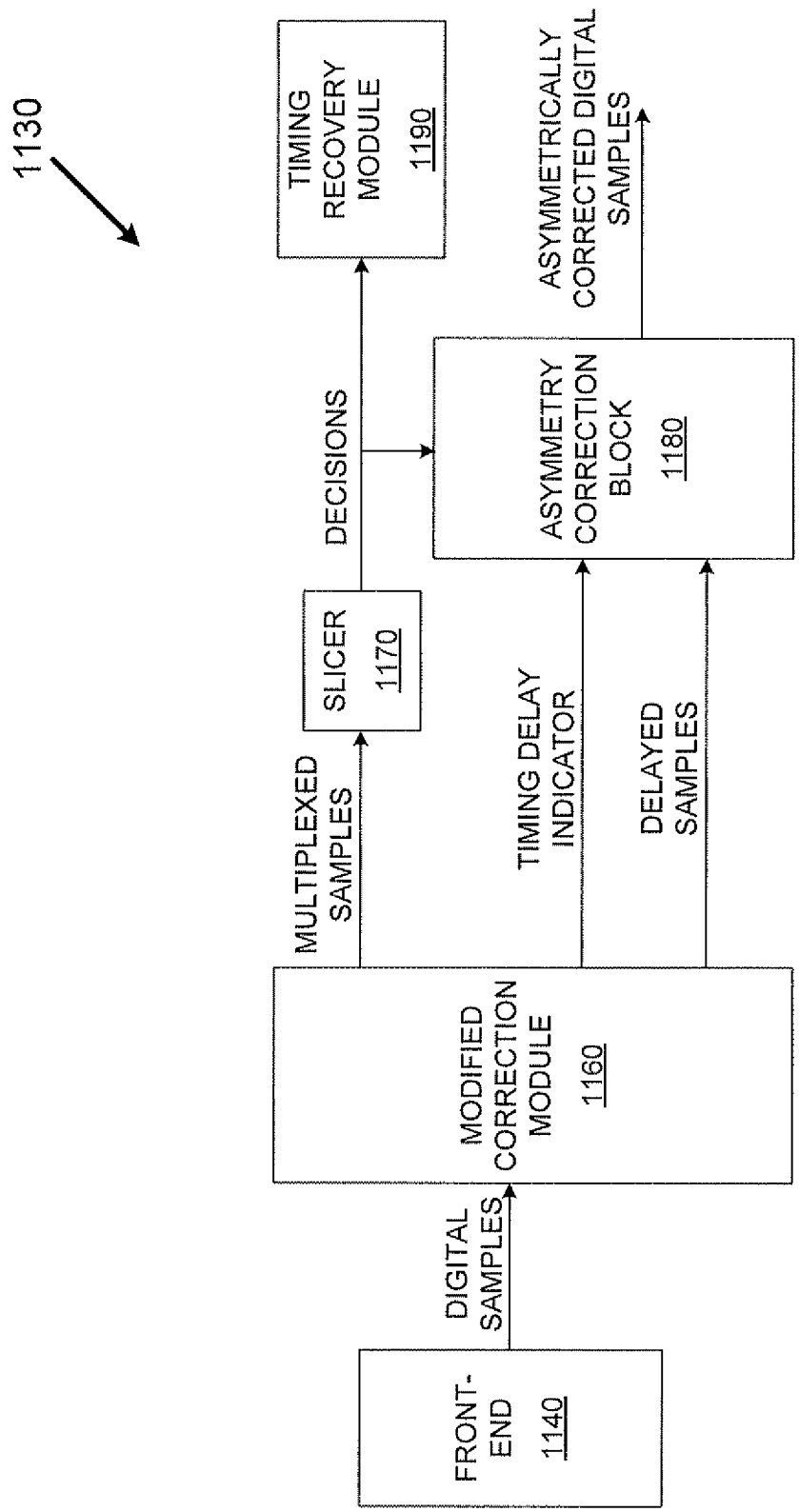
FIG. 11 shows a block diagram of a read channel example 1130 according to an embodiment of the disclosure.

FIG. 11 shows a block diagram of an example read channel 1130 according to an embodiment of the disclosure modified so as to improve stability when gain and offset of an input signal change drastically, i.e., a profile variation occurs due to a fingerprint or other issue. The read channel 1130 includes a front-end 1140, a modified feed-forward correction module 1160, a slicer 1170, an asymmetry correction block 1180 and a timing recovery block 1190.

As with earlier examples, the front-end 1140 receives an input signal from an optical disc or other device to produce a stream of input digital samples. The input digital samples, in turn, are provided to the modified feed-forward correction module 1160, which produces three signals including: (1) a stream of delayed samples, (2) a stream of multiplexed samples, and (3) a timing delay indicator that indicates whether there is a profile variation of the stream of digital samples triggering operational changes within the modified feed-forward correction module 1160 that are described in further detail below.

The slicer 1170 receives the multiplexed samples to produce a stream of decision, which are in turn provided to the timing recovery block 119 and to the asymmetry correction block 1180.

The asymmetry correction block 1180 receives the stream of decisions from the slicer 1170, as well as the timing delay indicator and the stream of delayed samples from the modified feed-forward correction module 1160, to produce a stream of asymmetrically corrected digital samples sequence.

During operation, the modified feed-forward correction module 1160, the slicer 1170, and the timing recovery block 1190 operate as part of a timing loop. During times of profile variations, the modified feed-forward correction module 1160 acts to adjust the parameters of this timing loop to assure stability of the loop.

For example, as will be disclosed below, the modified feed-forward correction module 1160 uses delayed samples during times when profile variations occur. The inherent delay, however, cause a non-linear phase-lag in the timing loop that threatens the stability of the timing loop. In order to compensate for this stability issue, various internal gains are decreased to compensate for such possible instability and thus improve performance.

Figure 12:
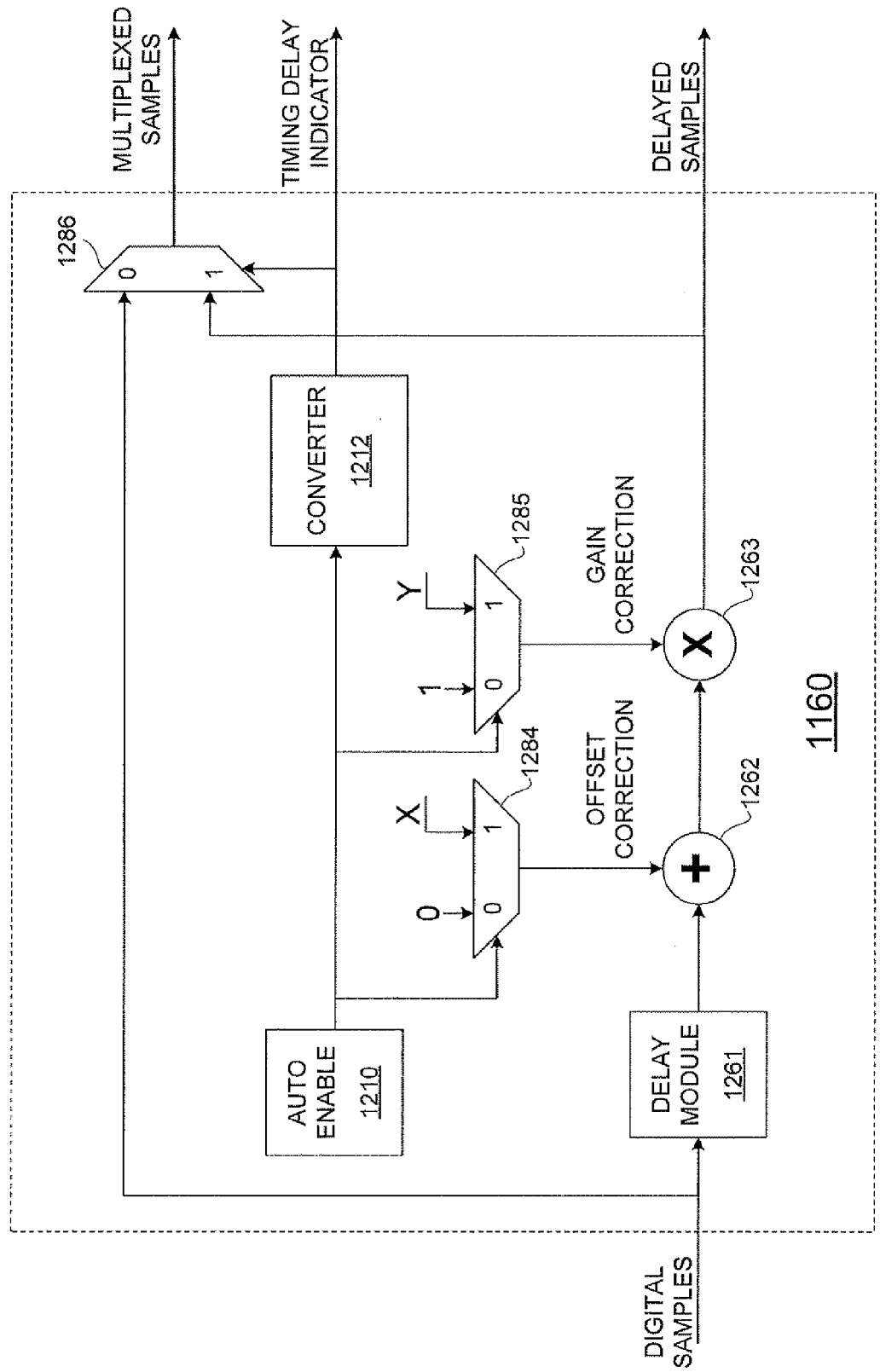
FIG. 12 shows a block diagram of the feed-forward correction module example 1160 of FIG. 11.

FIG. 12 shows a block diagram of the modified feed-forward correction module 1160 of FIG. 11. The modified feed-forward correction module 1160 includes a delay module 1261, an adder 1262, a multiplier 1263, an auto-enable 1210, a converter 1212, a first multiplexer 1284, a second multiplexer 1285 and a third multiplexer 1286. Other devices described above, including the signal offset and gain correction devices disclosed above, are not shown in FIG. 12 for simplicity but are assumed to provide same functionality including producing offset factor X and gain factor Y as with the previous examples.

Figure 16:
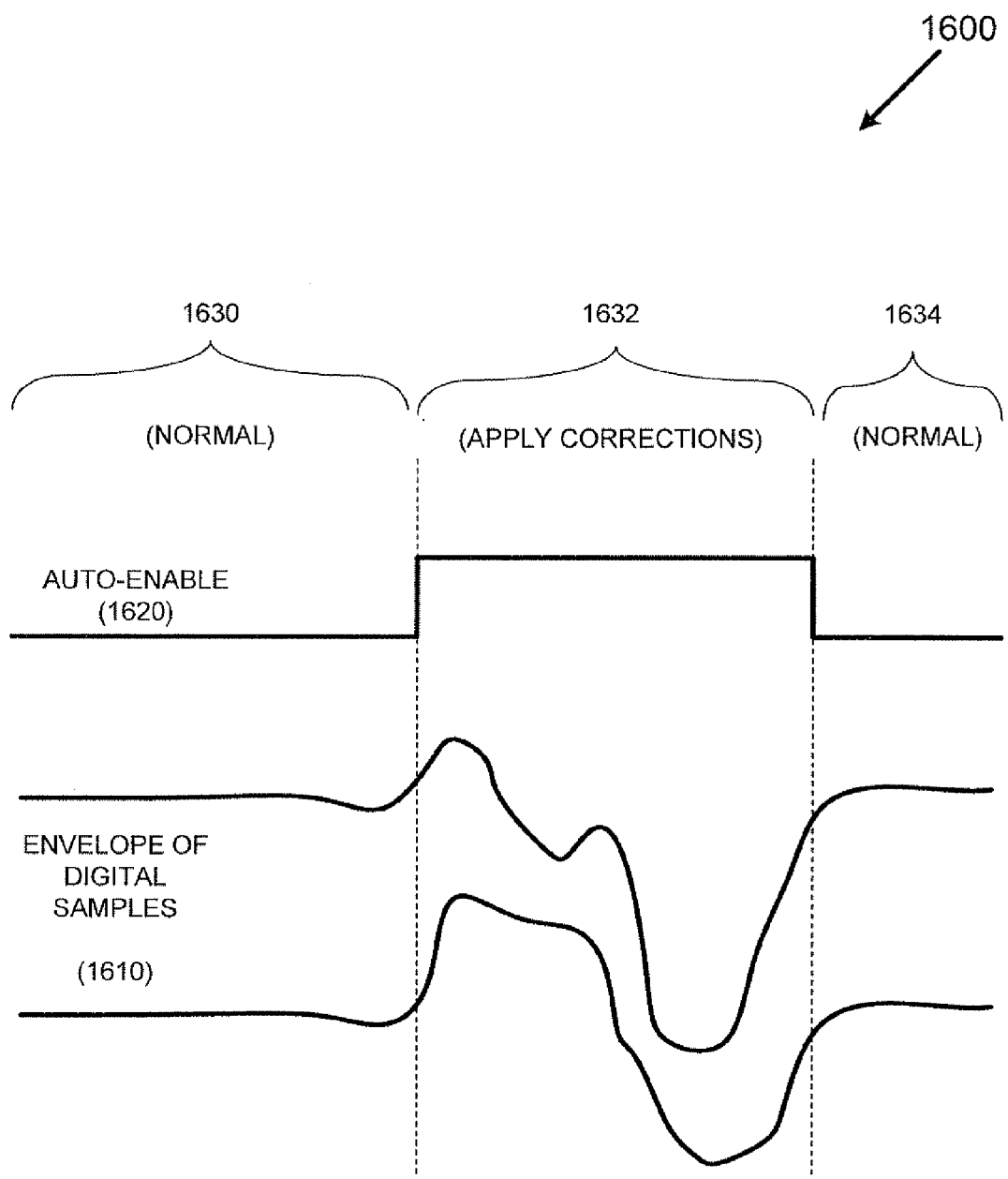
FIG. 16 shows an envelope of a profile of read data 1610 along with an output 1620 of an auto-enable.

In operation, the auto-enable 1210, which monitors the input signal, determines whether there is a profile variation. FIG. 16 shows an example envelope/profile of digital samples 1610 and a resultant output 1620 of the auto enable. During times {1630, 1634} when the digital samples 1610 display a "normal" envelope, the auto-enable output 1620 is a "0." However, during time 1632, which displays quick variations of the envelope 1610 (representing a variation in input signal profile), the auto-enable output 1620 is a "1."

Returning to FIG. 12, whenever there are no profile variations, the auto-enable produces a "0" signal to the first multiplexer 1284 and the second multiplexer 1285, which effectively removes any offset correction X and gain correction Y from the stream of delayed samples while also causing the third multiplexer 1286 to pass the input digital samples through to the multiplexed samples line. In contrast, whenever there are significant profile variations, the auto-enable produces a "1" signal to the first multiplexer 1284 and the second multiplexer 1285, which effectively incorporates offset correction X and gain correction Y into the stream of delayed samples while also causing the third multiplexer 1286 to pass the delayed digital samples through to the multiplexed samples line.

Also when there are no profile variations, the auto-enable provides its "0" signal to the converter 1212, which in various embodiments simply outputs a "0" signal until the auto-enable signal transitions from "0" to "1" when it toggles to a "1" signal and stays as a "1" signal until reset by other means. The output of the converter 1212 is the timing delay indicator, which is provided to the third multiplexer 1286 and to various external devices as disclosed above. While in the present example the converter 1212 switches the output to a "1" signal when the input switches to "1", this configuration can change in other examples.

Using the timing delay indicator, the third multiplexer 1286 switches its output between the received/input digital samples and the delayed digital samples. That is, whenever the timing delay indicator=1, the third multiplexer 1286 feeds the delayed digital signals to the multiplexed samples line; otherwise, when the timing delay indicator=0, the third multiplexer 1286 feeds the received/input digital signals to the multiplexed samples line.

Figure 13:
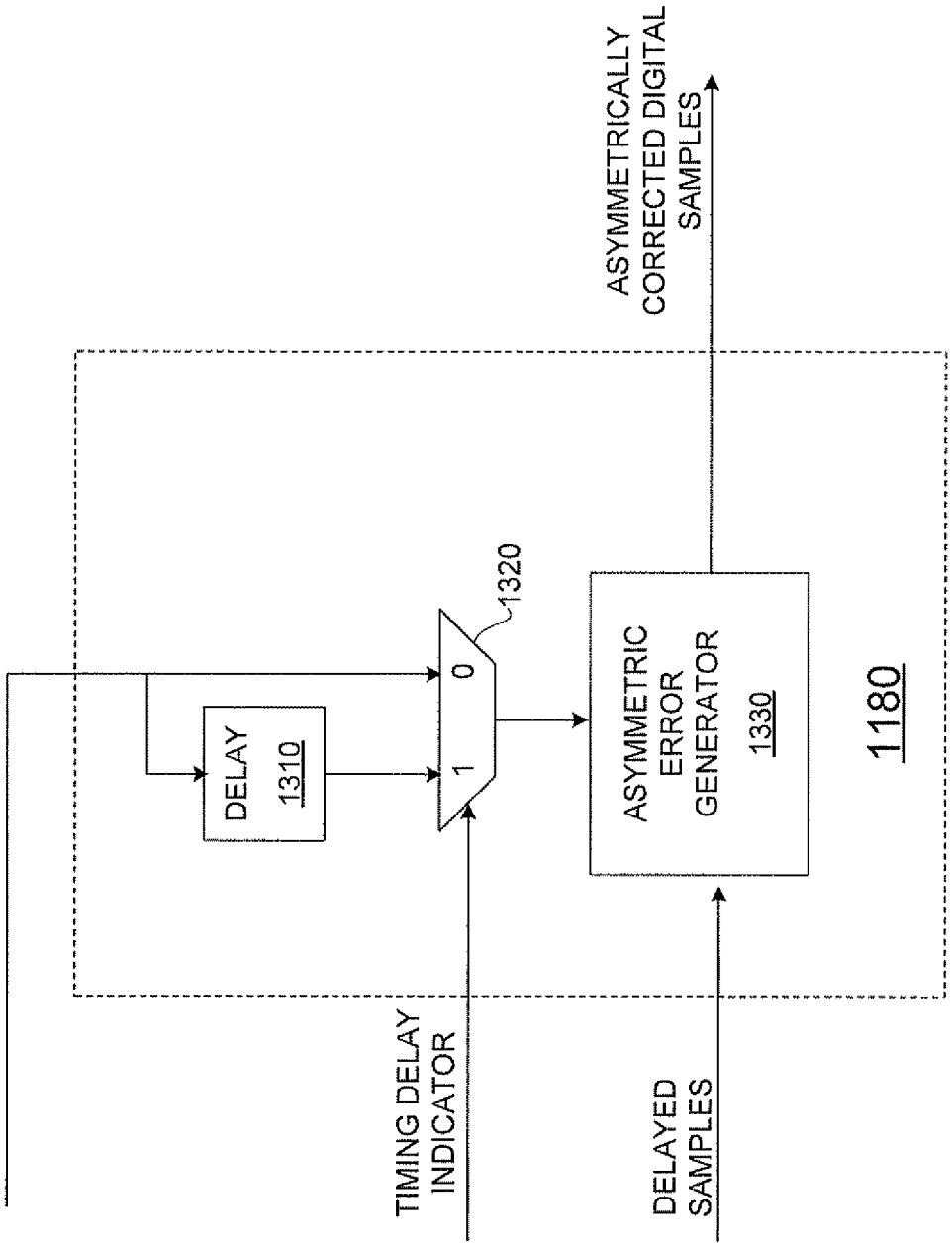
FIG. 13 shows a block diagram of the asymmetry correction block 1180 of FIG. 11.

FIG. 13 shows a block diagram of the asymmetry correction block 1180 of FIG. 11. The asymmetry correction block 1180 includes a delay 1310, a multiplexer 1320 and an asymmetric error generator 1330.

In operation, decisions from the slicer 1170 of FIG. 11, which can be produced using input data samples or delayed data samples, are provided to the delay 1310 and to a first input of the multiplexer 1320. The delay 1310 receives the decisions and delays the decisions by a number of samples equal to the delay caused by delay module 1261 of FIG. 12 to produce a stream of delayed decisions to the other input of multiplexer 1320.

The multiplexer 1320 further receives the timing delay indicator and, based on the state of the timing delay indicator provides either the decisions directly from the slicer 1170 or delayed decisions via delay 1310 to the asymmetric error generator 1330, which with the delayed samples can produce the asymmetrically corrected digital samples.

Figure 14:
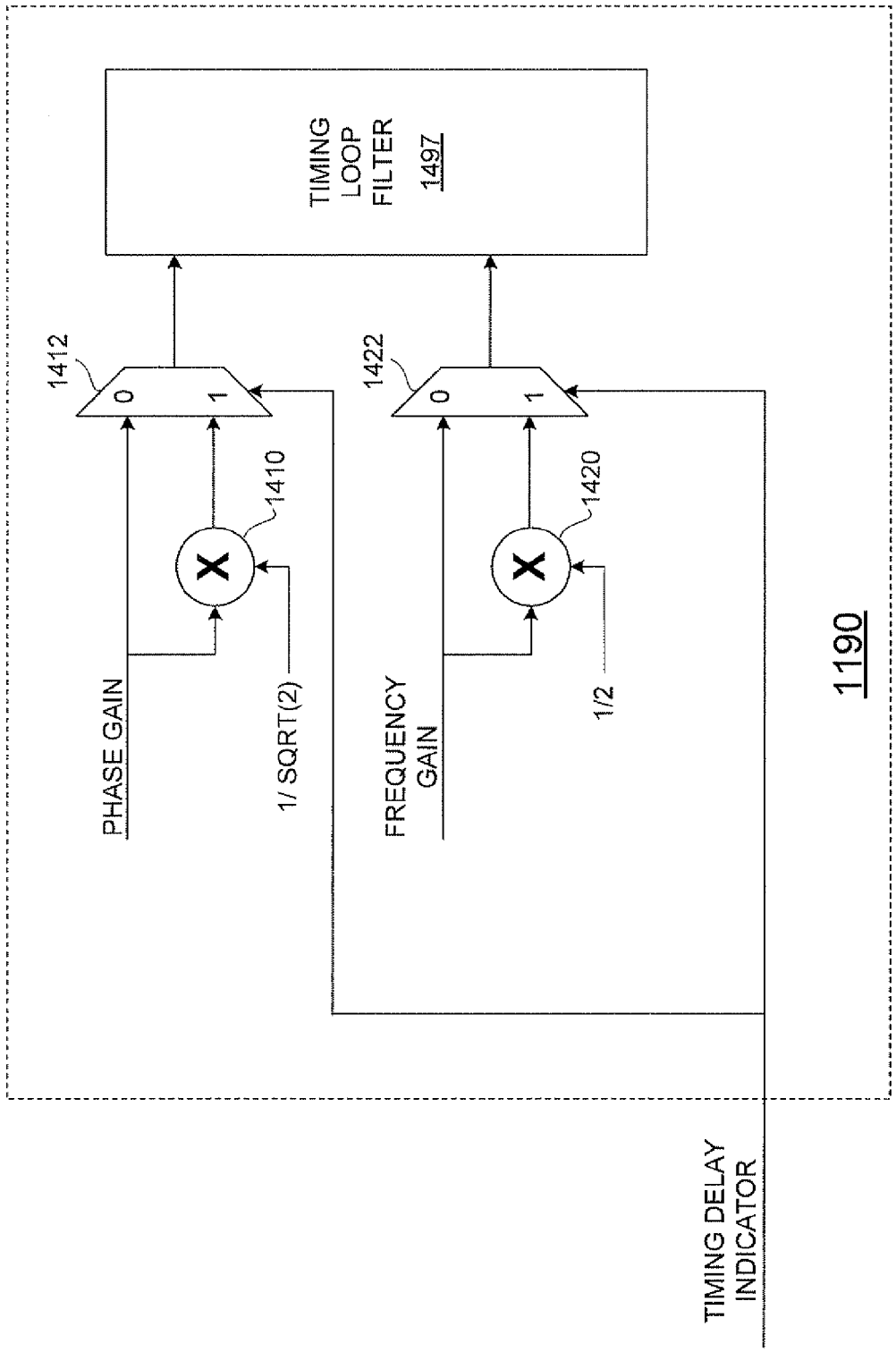
FIG. 14 shows a block diagram of the timing recovery block 1190 of FIG. 11.

FIG. 14 shows a block diagram of the timing recovery block 1190 of FIG. 11. The timing recovery block 1190 includes a first multiplier 1410, a first multiplexer 1412, a second multiplier 1420, a second multiplexer 1422 and a timing loop filter 1497.

In operation, whenever there are no profile variations (timing delay indicator=0), the first multiplexer 1412 allows a phase gain signal to pass to the timing loop filter 1497. Similarly when there are no profile variations, the second multiplexer 1422 allows a frequency gain signal to pass to the timing loop filter 1497.

However, whenever there are significant profile variations (timing delay indicator=1), the first multiplier 1410 and the first multiplexer 1412 work together to attenuate the phase gain signal by 1/SQRT(2) and provide the attenuated phase gain signal to the timing loop filter 1497. Similarly, the second multiplier 1420 and the second multiplexer 1422 work together to provide an attenuated (½) frequency gain signal to the timing loop filter 1497. By attenuating frequency gain and phase gain during periods of profile variation, timing recovery becomes increasingly stable to compensate for the additional delay caused by using delayed samples.

Figure 15:
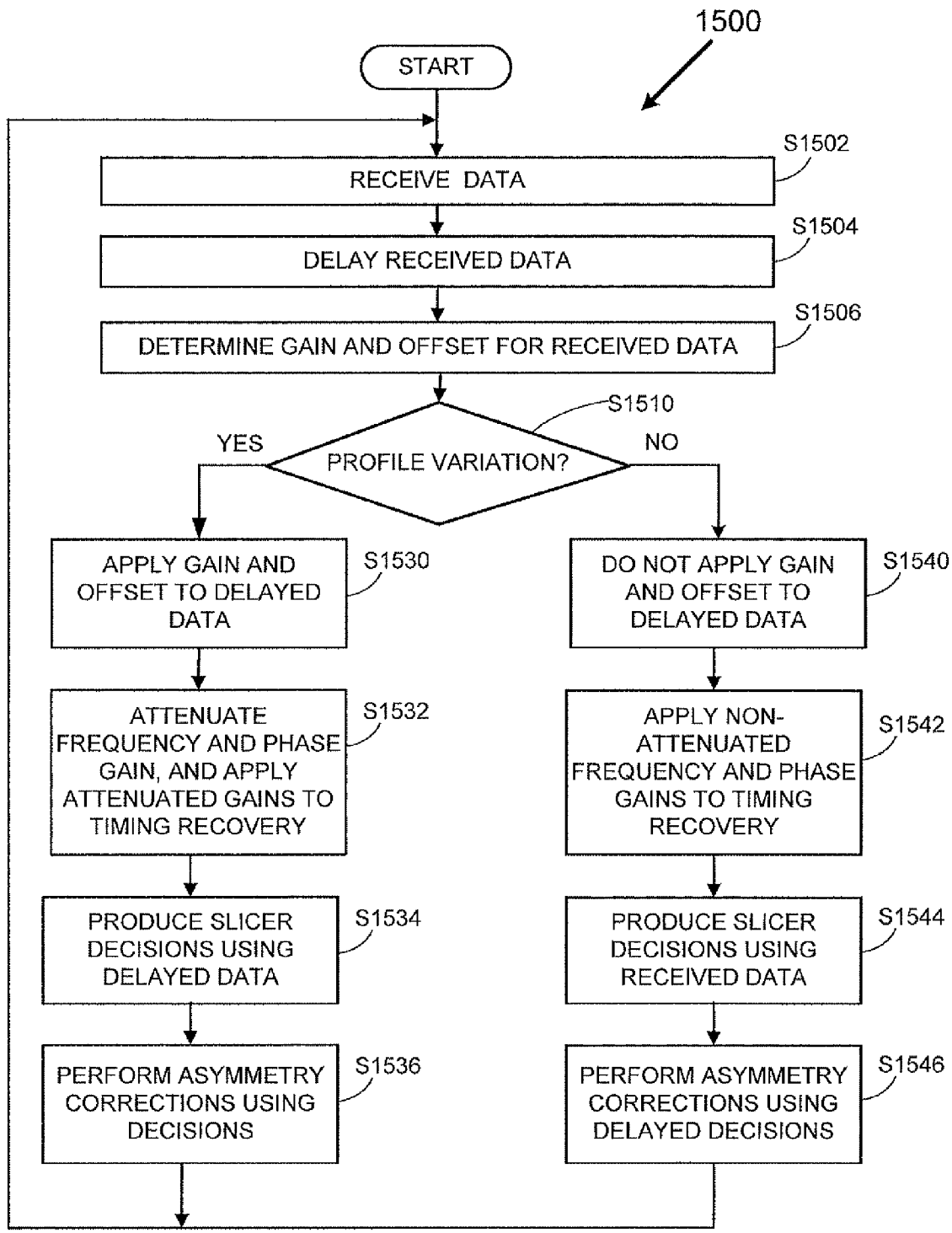
FIG. 15 shows a flow chart outlining a process example 1500 according to an embodiment of the disclosure.

FIG. 15 shows a flow chart 1500 outlining an example process according to an embodiment of the disclosure. The process starts in S1502 where a stream of digital samples are received representing an input from an electrical signal produced from an optical disc reading device or other apparatus. Next, in S1.504, the received digital samples are delayed to produce a stream of delayed samples. Then, in S1506, prospective gain and offset values are determined for the delayed data. Control continues to S1510.

At S1510, a determination is made as to whether a profile variation of the received data is detected. If a profile variation is detected, control jumps to S1530; otherwise, control jumps to S1540.

At S1530, in response to a profile variation being detected, one or both of an offset X and a gain Y are applied to the delayed data samples of S1504. Next, at S1532, attenuated frequency gain and phase gain values are applied to a timing recovery filter/process. As discussed above, frequency gain is attenuated by ½ and phase gain is attenuated by 1/SQRT(2). Control continues to S1534.

At S1534, slicer decisions are produced using the delayed data. Next, at S1536, an process is performed using the slicer decisions of S1534 to produce asymmetrically corrected digital samples. Control then jumps back to S1502 where the process is repeated as necessary or otherwise desired.

At S1540, in response to a profile variation not being detected, neither the offset X nor the gain Y is applied to the delayed data samples of S1504. Next, at S1542, non-attenuated frequency and phase gain values are applied to the timing recovery filter/process. Control continues to S1544.

At S1544, slicer decisions are produced using the received (non-delayed) data. Next, at S1546, an process is performed using the delayed slicer decisions of S1544 to produce asymmetrically corrected digital samples. Control then jumps back to S1502 where the process is repeated as necessary or as otherwise desired.

It is noted that the various embodied devices of the disclosure, such as the feed-forward correction modules 360A, 36013, 460, 560, 660 and 1160, the averaging filters 1000A and 1000E can be implemented by various techniques, such as integrated circuits, instruction codes executed by a processor, or a combination of integrated circuits and instruction codes. In an example, a feed-forward correction module, such as the feed-forward correction modules 460, 560, 660, 1160 and the like, is implemented solely by integrated circuits. In another example, a portion of a feed-forward correction module, such as the multiplexer controllers 485, 475, 585, 575, 685, 675, and the like, is implemented as instruction codes that can be executed by a processor.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A signal processing circuit, comprising:
   a processing path configured to process an electrical signal corresponding to content data on a storage medium to produce input data samples; and
   a feed-forward correction module configured to delay the input data samples to produce delayed data samples, and to apply the delayed data samples to a timing loop during periods when a profile variation of the data samples is detected.

2. The signal processing circuit of claim 1, wherein the feed-forward correction module is further configured to apply the input data sample to the timing loop during periods when a profile variation of the data samples is not detected.

3. The signal processing circuit of claim 2, wherein the feed-forward correction module is configured to apply at least one of offset correction and gain correction to the delayed data samples during periods when the profile variation of the data samples is detected, and not to apply offset correction and gain correction to the delayed data samples during periods when the profile variation of the data samples is not detected.

4. The signal processing circuit of claim 3, wherein the feed-forward correction module is configured to apply both the offset correction and gain correction to the delayed data samples during periods when the profile variation of the data samples is detected.

5. The signal processing circuit of claim 2, further comprising a timing recovery block configured to apply a first phase gain and a first frequency gain to a timing loop filter during periods when the profile variation of the data samples is not detected, and to apply an attenuated first phase gain and an attenuated first frequency gain to the timing loop filter during periods when the profile variation of the data samples is detected.

6. The signal processing circuit of claim 5, wherein the attenuated first frequency gain is ½ of the first frequency gain.

7. The signal processing circuit of claim 5, wherein the attenuated first phase gain is 1/SQRT(2) of the first phase gain.

8. The signal processing circuit of claim 2, further comprising a slicer coupled to a multiplexer and configured to produce decision from the delayed data samples during the periods when the profile variation of the data samples is detected, and to produce decisions from the input data samples during periods when the profile variation of the data samples is not detected.

9. The signal processing circuit of claim 8, further comprising an asymmetry correction block configured to produce asymmetrically corrected digital samples based on decisions from the slicer and the delayed data samples.

10. The signal processing circuit of claim 9, wherein the asymmetry correction block is configured to produce asymmetrically corrected digital samples based on delayed decisions when the profile variation of the data samples is detected.

11. A signal processing method, comprising:
receiving input data samples corresponding to content data on a storage medium;
detecting whether or not a profile variation of the input data samples is occurring;
delaying the received data samples to produce delayed data samples; and
applying the delayed data samples to a timing loop during periods when a profile variation of the data samples is detected.

12. The method of claim 11, further comprising applying the input data sample to the timing loop during periods when the profile variation of the data samples is not detected.

13. The method of claim 12, further comprising applying at least one of offset correction and gain correction to the delayed data samples if the profile variation is detected, and not applying the offset correction and the gain correction to the delayed data samples if the profile variation of the data samples is not detected.

14. The method of claim 13, wherein if the profile variation is detected, applying both the offset correction and the gain correction to the delayed data samples.

15. The method of claim 12, further comprising:
applying a first phase gain and a first frequency gain to a timing loop filter during periods when the profile variation of the data samples is not detected, and
applying an attenuated first phase gain and an attenuated first frequency gain to the timing loop filter during periods when the profile variation of the input data samples is detected.

16. The method of claim 15, wherein the attenuated first frequency gain is ½ of the first frequency gain.

17. The method of claim 15, wherein the attenuated first phase gain is 1/SQRT(2) of the first phase gain.

18. The method of claim 11, further comprising:
producing slicer decisions from the delayed data samples during periods when the profile variation of the data samples is detected; and
producing slicer decisions from the input data samples during periods when the profile variation of the data samples is not detected.

19. The method of claim 16, further comprising:
producing asymmetrically corrected digital samples based on decisions from the slicer and the delayed data samples.

20. The method of claim 17, wherein producing asymmetrically corrected digital samples includes producing asymmetrically corrected digital samples based on delayed decisions when the profile variation of the data samples is detected.

* * * * *